(12) United States Patent
Bittner et al.

(10) Patent No.: US 9,777,094 B2
(45) Date of Patent: Oct. 3, 2017

(54) WATER-SOLUBLE, HYDROPHOBICALLY ASSOCIATING COPOLYMERS HAVING NOVEL HYDROPHOBICALLY ASSOCIATING MONOMERS

(71) Applicant: BASF SE, Ludwigshafen (DE)

(72) Inventors: Christian Bittner, Bensheim (DE);
Björn Langlotz, Trostberg (DE);
Benjamin Wenzke, Hamburg (DE);
Christian Spindler, Houston, TX (US);
Roland Reichenbach-Klinke, Traunstein (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/652,648

(22) PCT Filed: Dec. 13, 2013

(86) PCT No.: PCT/EP2013/076523
§ 371 (c)(1),
(2) Date: Jun. 16, 2015

(87) PCT Pub. No.: WO2014/095621
PCT Pub. Date: Jun. 26, 2014

(65) Prior Publication Data
US 2015/0329660 A1 Nov. 19, 2015

(30) Foreign Application Priority Data
Dec. 17, 2012 (EP) ..................... 12197504

(51) Int. Cl.
*C08F 220/56* (2006.01)
*C09K 8/588* (2006.01)
*E21B 43/20* (2006.01)
*C08F 216/14* (2006.01)

(52) U.S. Cl.
CPC ...... *C08F 220/56* (2013.01); *C08F 216/1416* (2013.01); *C09K 8/588* (2013.01); *E21B 43/20* (2013.01); *C08F 2216/1433* (2013.01)

(58) Field of Classification Search
None
See application file for complete search history.

(56) References Cited

U.S. PATENT DOCUMENTS

| 7,238,760 | B2 | 7/2007 | Schinabeck et al. |
| 7,605,196 | B2 | 10/2009 | Schinabeck et al. |
| 2010/0331510 | A1* | 12/2010 | Reichenbach-Klinke ............. C08F 220/26 526/274 |
| 2012/0129739 | A1 | 5/2012 | Pfeuffer et al. |

FOREIGN PATENT DOCUMENTS

| CA | 2760734 A1 | 11/2010 |
| CA | 2817792 A1 | 5/2012 |
| CA | 2826635 A1 | 10/2012 |
| CN | 102146159 A | 8/2011 |
| DE | 100 37 629 A1 | 2/2002 |
| DE | 10 2004 032 304 A1 | 2/2006 |
| EP | 705 854 A1 | 4/1996 |
| WO | WO 2010/133527 A3 * | 11/2010 |
| WO | WO-2010133527 A2 | 11/2010 |
| WO | WO-2011/015520 A1 | 2/2011 |
| WO | WO-2012069477 A1 | 5/2012 |
| WO | WO-2012136613 A1 | 10/2012 |

OTHER PUBLICATIONS

Translation of the International Preliminary Report on Patentability for PCT/EP2013/076523 dated Jun. 17, 2015.
Fink, J.K., "Hydraulic Fracturing Fluids", Oil Fields Chemicals, Chapter 17, Elsevier B.V., (2003), pp. 233-275.
International Search Report for PCT/EP2013/076523 mailed Feb. 24, 2014.
Taylor, K.C., "Rheology of Hydrophobically Associating Polymers for Oilfield Applications", Annual Transactions of the Nordic Rheology Society, vol. 11, (2003), pp. 13-18.
Taylor, K.C., et al., "Water-soluble hydrophobically associating polymers for improved oil recovery: A literature review", Journal of Petroleum Science and Engineering, vol. 19, (1998), pp. 265-280.

* cited by examiner

*Primary Examiner* — Jeffrey Washville
(74) *Attorney, Agent, or Firm* — Drinker Biddle & Reath LLP

(57) ABSTRACT

The present invention relates to water-soluble hydrophobically associating copolymers which are obtained in the presence of a nonpolymerizable surface-active compound and which comprise novel hydrophobically associating monomers. The monomers comprise an ethylenically unsaturated group and a polyether block, the polyether block comprising a hydrophilic polyethyleneoxy block and a hydrophobic polyalkyleneoxy block consisting of alkyleneoxy units having at least 4 carbon atoms. The monomers may optionally have a terminal polyethyleneoxy block. The invention further relates to processes for preparing the copolymers and to the use thereof.

20 Claims, No Drawings

WATER-SOLUBLE, HYDROPHOBICALLY ASSOCIATING COPOLYMERS HAVING NOVEL HYDROPHOBICALLY ASSOCIATING MONOMERS

CROSS-REFERENCE TO RELATED APPLICATIONS

This application is a national stage application (under 35 U.S.C. §371) of PCT/EP2013/076523, filed Dec. 13, 2013, which claims benefit of European Application No. 12197504.9, filed Dec. 17, 2012, both of which are incorporated herein by reference in their entirety.

The present invention relates to water-soluble hydrophobically associating copolymers which are obtained in the presence of a nonpolymerizable surface-active compound and which comprise novel hydrophobically associating monomers. The monomers comprise an ethylenically unsaturated group and a polyether block, the polyether block comprising a hydrophilic polyethyleneoxy block and a hydrophobic polyalkyleneoxy block consisting of alkyleneoxy units having at least 4 carbon atoms. The monomers may optionally have a terminal polyethyleneoxy block. The invention further relates to processes for preparing the copolymers and to the use thereof.

Water-soluble thickening polymers are used in many fields of industry, for example in the cosmetics sector, in foods, for production of cleaning products, printing inks and emulsion paints, and in mineral oil production.

Many chemically different classes of polymers usable as thickeners are known. An important class of thickening polymers is that of what are called hydrophobically associating polymers. This is understood by those skilled in the art to mean water-soluble polymers having lateral or terminal hydrophobic groups, for example relatively long alkyl chains. In aqueous solution, such hydrophobic groups can associate with themselves or with other substances having hydrophobic groups. This forms an associative network, which thickens the medium.

EP 705 854 A1, DE 100 37 629 A1 and DE 10 2004 032 304 A1 describe water-soluble hydrophobically associating copolymers and the use thereof, for example in the construction chemistry sector.

It is known that hydrophobically associating copolymers can be used in the mineral oil production sector, especially for tertiary mineral oil production (enhanced oil recovery, EOR). Details of this are described, for example, in the review article by Taylor, K. C. and Nasr-El-Din, H. A. in J. Petr. Sci. Eng. 1998, 19, 265-280.

One of the techniques of tertiary mineral oil production is called "polymer flooding". A mineral oil deposit is not an underground "sea of mineral oil"; instead, the mineral oil is held in tiny pores in the mineral oil-bearing rock. The diameter of the cavities in the formation is typically only a few micrometers. For polymer flooding, an aqueous solution of a thickening polymer is injected through injection wells into a mineral oil deposit. The injection of the polymer solution forces the mineral oil through said cavities in the formation from the injection well proceeding in the direction of the production well, and the mineral oil is produced through the production well. It is important for this application that the aqueous polymer solution does not comprise any gel particles whatsoever. Even small gel particles having dimensions in the micrometer range can block the fine pores in the formation and thus stop the mineral oil production. Hydrophobically associating copolymers for tertiary mineral oil production should therefore have a minimum proportion of gel particles.

A further technique in mineral oil production is called "hydraulic fracturing". "Hydraulic fracturing" typically involves injecting a high-viscosity aqueous solution under high pressure into the oil- or gas-bearing formation stratum. The high pressure gives rise to cracks in the rock, which facilitate the production of oil or gas. The thickeners used here are particularly guar and the more thermally stable derivatives thereof, for example hydroxypropyl guar or carboxymethyl hydroxypropyl guar (J. K. Fink, Oil Field Chemicals, Elsevier 2003, p. 240 ff). These biopolymers, however, like most polymers in general, have a distinct decrease in viscosity with rising temperature. Since, however, elevated temperatures prevail in the underground formations, it would be advantageous for use in "hydraulic fracturing" to use thickeners whose viscosity does not decrease or even rises with rising temperature.

Further fields of use of hydrophobically associating copolymers in the field of mineral oil production is the thickening of drilling muds and completion fluids. This is described, for example, in the review article Taylor, Ann. Transactions of the Nordic Rheology Society, Vol. 11, 2003.

WO 2010/133527 describes the preparation of hydrophobically associating monomers of the $H_2C=C(R^1)-R^4-O-(-CH_2-CH(R^2)-O-)_k-(-CH_2-CH(R^3)-O-)_l-R^5$ type and the subsequent reaction with further hydrophilic monomers to give copolymers. The macromonomers described have an ethylenically unsaturated group and a polyether group with block structure consisting of a hydrophilic polyalkyleneoxy block consisting essentially of ethyleneoxy units and of a terminal hydrophobic polyalkyleneoxy block consisting of alkyleneoxy units having at least 4 carbon atoms.

The document WO 2011/015520 describes the copolymerization of hydrophobically associating monomers and monoethylenically unsaturated hydrophilic monomers in the presence of nonionic surfactants and the use of the copolymers formed for polymer flooding.

CN 102146159 A likewise describes a process for preparing a polyvinyl ether monomer, the polyether monomer having the general formula $H_2C=C(R^2)-O-R^1-O-(C_aH_{2a}O)_n-(C_bH_{2b}O)_m-H$ where a and b are each integers from 2 to 4, a does not equal b, and $R^1$ is a $C_1$-$C_8$-alkylene group. The monomers described in the document have a polyalkyleneoxy block formed from ethylene oxide, propylene oxide and/or butylene oxide. The alkoxylation is preferably performed at a temperature in the range from 120 to 160° C. with addition of an alkylic catalyst, for example potassium methoxide. For preparation of the monomers, the process according to WO 2010/133527 proceeds from suitable monoethylenically unsaturated alcohols, which are subsequently alkoxylated in a two-stage process, such that the block structure mentioned is obtained. Alkoxylation is effected first with ethylene oxide, optionally in a mixture with propylene oxide and/or butylene oxide, and, in a second step, with alkylene oxides having at least 4 carbon atoms. The examples in WO 2010/133527 describe the performance of the alkoxylation using KOMe (potassium methoxide) as a catalyst at a reaction temperature of 140° C., the concentration of potassium ions being above 3 mol %.

The alkoxylation reaction is frequently performed under base catalysis. For this purpose, the alcohol used as the starting material is typically admixed with alkali metal hydroxides or alkali metal alkoxides in a pressure reactor and converted to the corresponding alkoxide. Subsequently, usually under inert gas atmosphere, the alkylene oxides are metered in, for example in a plurality of steps. In order to control the reaction and avoid oversaturation of the reaction mixture with alkylene oxide, it is usually necessary to maintain particular pressure and temperature ranges in the alkoxylation.

The process according to WO 2010/133527 is said to avoid the formation of crosslinking by-products, and so the preparation of copolymers with a low gel content is said to be possible.

It has been found, however, that the prior art preparation processes do not constitute a reliable method for preparation of hydrophobically associating copolymers with a low gel content. Fluctuating copolymer qualities have been found, for example in the event of variation of pressure and reaction time in the alkoxylation steps, such that sometimes highly crosslinked copolymer products have been obtained.

It has been found that, in prior art processes, monomers having two ethylenically unsaturated groups are probably formed as a by-product. These bifunctional by-products have a crosslinking effect and lead to increased gel formation in the copolymerization. It has been found that occurrence of these unwanted side reactions increases with temperature and duration of the reaction. Copolymers with a gel content are generally no longer filterable and no longer usable for injection into porous matrices in mineral oil deposits.

There is typically a preference for KOMe (potassium methoxide) as a basic catalyst over NaOMe (sodium methoxide), since KOMe is more strongly basic than NaOMe, and therefore the alkoxylation reaction proceeds more quickly. It has been found, however, that the more strongly basic KOMe promotes the formation of the above-described crosslinking monomers. Butylene oxide and pentylene oxide react much more slowly than ethylene oxide or propylene oxide; therefore, the side reactions in the case of alkoxylation with butylene oxide or pentylene oxide have a more distinct effect.

It was therefore an object of the invention to provide hydrophobically associating copolymers with lower or undetectable gel contents compared to the already known copolymers, proceeding from novel, crosslinker-free monomers. The copolymers were also to be preparable more economically than to date, and the action thereof as thickeners was to be at least equal compared to the existing compounds.

It has now been found that, surprisingly, the formation of crosslinking bifunctional compounds and hence the gel content in the resulting copolymers can be reduced or virtually completely avoided when a critical amount of potassium ions less than or equal to 0.9 mol % based on the alcohol to be alkoxylated and a temperature less than or equal to 135° C. is observed in the second alkoxylation step (reaction with butylene oxide or pentylene oxide). It has additionally been found that the preparation process according to the invention, with the given safety demands relating to chemistry and operation (more particularly a pressure less than 2.1 bar in the alkoxylation with pentylene oxide and more particularly a pressure of less than 3.1 bar in the alkoxylation with butylene oxide), ensures good reproducibility with reasonable reaction time.

Accordingly, water-soluble hydrophobically associating copolymers comprising the following monomers have been found:
(a) 0.1 to 20% by weight of at least one hydrophobically associating monomer (a), and (b) 25 to 99.9% by weight of at least one hydrophilic monomer (b) other than monomer (a),
with use of at least one further, nonpolymerizable surface-active component (c) in the course of synthesis thereof, prior to the initiation of the polymerization reaction,
where the stated amounts are each based on the total amount of all monomers in the copolymer, and at least one of the monomers (a) being a monomer of the general formula (I)

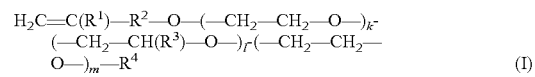

where the $-(-CH_2-CH_2-O-)_k$, $-(-CH_2-CH(R^3)-O-)_l$ and optionally $-(-CH_2-CH_2-O-)_m$ units are arranged in block structure in the sequence shown in formula (I)
and the radicals and indices are each defined as follows:
k: is a number from 15 to 35, preferably from 20 to 28, more preferably from 23 to 26;
l: is a number from 5 to 30, preferably from 5 to 28, preferably from 5 to 25;
m: is a number from 0 to 15, preferably from 0 to 10;
$R^1$: is H or methyl;
$R^2$: is independently a single bond or a divalent linking group selected from the group of $-(C_nH_{2n})-$ and $-O-(C_{n'}H_{2n'})-$, where n is a natural number from 1 to 6 and n' is a natural number from 2 to 6,
$R^3$: is independently a hydrocarbyl radical having at least 2 carbon atoms or an ether group of the general formula $-CH_2-O-R^{3'}$ where $R^{3'}$ is a hydrocarbyl radical having at least 2 carbon atoms; with the proviso that the sum total of the carbon atoms in all hydrocarbyl radicals $R^3$ or $R^{3'}$ is in the range from 15 to 60, preferably from 15 to 56, preferably from 15 to 50,
$R^4$: is independently H or a hydrocarbyl radical having 1 to 4 carbon atoms;
and the hydrophobically associating monomer (a) of the general formula (I) being obtainable by a process comprising the following steps:
a) reacting a monoethylenically unsaturated alcohol A1 of the general formula (II)

with ethylene oxide,
where the $R^1$ and $R^2$ radicals are each as defined above;
with addition of an alkaline catalyst C1 comprising KOMe and/or NaOMe to obtain an alkoxylated alcohol A2;
b) reacting the alkoxylated alcohol A2 with at least one alkylene oxide Z of the formula (Z)

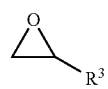

where $R^3$ is as defined above;
with addition of an alkaline catalyst C2;
where the concentration of potassium ions in the reaction in step b) is less than or equal to 0.9 mol %, preferably from 0.01 to 0.9 mol %, more preferably 0.01 to 0.5 mol %, based on the alcohol A2 used;
and where the reaction in step b) is performed at a temperature less than or equal to 135° C.,
to obtain an alkoxylated alcohol A3 of the formula (III)

$H_2C=C(R^1)-R^2-O-(-CH_2-CH_2-O-)_k-(-CH_2-CH(R^3)-O-)_l-R^4$ (III)

where $R^4$=H, where the $R^1$, $R^2$ and $R^3$ radicals and the indices k and l are each as defined above;

c) optionally reacting at least a portion of the alkoxylated alcohol A3 with ethylene oxide to obtain the alkoxylated alcohol A4 corresponding to the monomer (a) of the formula (I) where $R^4$=H and m>0;

d) optionally etherifying the alkoxylated alcohol A3 and/or A4 with a compound $R_4$—X where $R^4$ is as defined above and X is a leaving group, preferably selected from the group of Cl, Br, I, —O—S$_2$—CH$_3$ (mesylate), —O—SO$_2$—CF$_3$ (triflate) and —O—SO$_2$—OR$^4$ to obtain a monomer (a) of the formula (I) and/or (III) where $R^4$=hydrocarbyl radical having 1 to 4 carbon atoms.

In a preferred embodiment the invention relates to water-soluble hydrophobically associating copolymers, wherein the radicals and indices in monomers (a) of formula (I) are each defined as follows:

k: is a number from 23 to 26;
l: is a number from 5 to 30, preferably from 5 to 28, preferably from 5 to 25;
m: is a number from 0 to 15, preferably from 0 to 10;
$R^1$: is H or methyl;
$R^2$: is independently a single bond or a divalent linking group selected from the group of —(C$_n$H$_{2n}$)— and —O—(C$_{n'}$H$_{2n'}$)—, where n is a natural number from 1 to 6 and n' is a natural number from 2 to 6,
$R^3$: is independently a hydrocarbyl radical having at least 2 carbon atoms or an ether group of the general formula —CH$_2$—O—R$^{3'}$ where $R^{3'}$ is a hydrocarbyl radical having at least 2 carbon atoms; with the proviso that the sum total of the carbon atoms in all hydrocarbyl radicals $R^3$ or $R^{3'}$ is in the range from 15 to 60, preferably from 15 to 56, preferably from 15 to 50;
$R^4$: is independently H or a hydrocarbyl radical having 1 to 4 carbon atoms.

In a preferred embodiment, the sum total of all monomers in the copolymer is 100% by weight.

The monomer a) is preferably exclusively a monomer of the general formula (I) as described above.

In a preferred embodiment water-soluble hydrophobically associating copolymers comprising the following monomers have been found:

(c) 0.1 to 20% by weight of at least one hydrophobically associating monomer (a), and
(d) 25 to 99.9% by weight of at least one hydrophilic monomer (b) other than monomer (a),
with use of at least one further, nonpolymerizable surface-active component (c) in the course of synthesis thereof, prior to the initiation of the polymerization reaction, where the stated amounts are each based on the total amount of all monomers in the copolymer, and at least one of the monomers (a) being a monomer of the general formula (I)

$H_2C=C(R^1)-R^2-O-(-CH_2-CH_2-O-)_k-(-CH_2-CH(R^3)-O-)_l-(-CH_2-CH_2-O-)_m-R^4$ (I)

where the -(-CH$_2$-CH$_2$-O-)$_k$-, -(-CH$_2$-CH(R$^3$)-O-)$_3$- and optionally -(-CH$_2$-CH$_2$-O-)$_m$- units are arranged in block structure in the sequence shown in formula (I)

and the radicals and indices are each defined as follows:
k: is a number from 23 to 26;
l: is a number from 8.5 to 17.25;
m: is a number from 0 to 15, preferably from 0 to 10;
$R^1$: is H or methyl;
$R^2$: is independently a single bond or a divalent linking group selected from the group of —(C$_n$H$_{2n}$)— and —O—(C$_{n'}$H$_{2n'}$)—, where n is a natural number from 1 to 6 and n' is a natural number from 2 to 6,
$R^3$: is independently a hydrocarbyl radical having at least 2 carbon atoms or an ether group of the general formula —CH$_2$—O—R$^{3'}$ where $R^{3'}$ is a hydrocarbyl radical having at least 2 carbon atoms; with the proviso that the sum total of the carbon atoms in all hydrocarbyl radicals $R^3$ or $R^{3'}$ is in the range from 25.5 to 34.5,
$R^4$: is independently H or a hydrocarbyl radical having 1 to 4 carbon atoms;

and the hydrophobically associating monomer (a) of the general formula (I) being obtainable by a process comprising the following steps:

a) reacting a monoethylenically unsaturated alcohol A1 of the general formula (II)

$H_2C=C(R^1)-R^2-OH$ (II)

with ethylene oxide,
where the $R^1$ and $R^2$ radicals are each as defined above;
with addition of an alkaline catalyst C1 comprising KOMe and/or NaOMe to obtain an alkoxylated alcohol A2;

b) reacting the alkoxylated alcohol A2 with at least one alkylene oxide Z of the formula (Z)

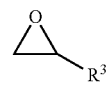 (Z)

where $R^3$ is as defined above;
with addition of an alkaline catalyst C2;
where the concentration of potassium ions in the reaction in step b) is less than or equal to 0.9 mol %, preferably from 0.01 to 0.9 mol %, more preferably 0.01 to 0.5 mol %, based on the alcohol A2 used;
and where the reaction in step b) is performed at a temperature less than or equal to 135° C.,
to obtain an alkoxylated alcohol A3 of the formula (III)

$H_2C=C(R^1)-R^2-O-(-CH_2-CH_2-O-)_k-(-CH_2-CH(R^3)-O-)_l-R^4$ (III)

where $R^4$=H, where the $R^1$, $R^2$ and $R^3$ radicals and the indices k and l are each as defined above;

c) optionally reacting at least a portion of the alkoxylated alcohol A3 with ethylene oxide to obtain the alkoxylated alcohol A4 corresponding to the monomer (a) of the formula (I) where $R^4$=H and m>0;

d) optionally etherifying the alkoxylated alcohol A3 and/or A4 with a compound $R_4$—X where $R^4$ is as defined above and X is a leaving group, preferably selected from the group of Cl, Br, I, —O—SO$_2$—CH$_3$ (mesylate), —O—SO$_2$—CF$_3$ (triflate) and —O—SO$_2$—OR$^4$ to obtain a monomer (a) of the formula (I) and/or (III) where $R^4$=hydrocarbyl radical having 1 to 4 carbon atoms.

In a preferred embodiment, the sum total of all monomers in the copolymer is 100% by weight.

The monomer a) is preferably exclusively a monomer of the general formula (I) as described above.

In addition, the preparation of such copolymers has been found, as has the use thereof for development, exploitation and completion of underground mineral oil and natural gas deposits.

Specific details of the invention are as follows:

The inventive hydrophobically associating copolymers are water-soluble copolymers having hydrophobic groups. In aqueous solution, the hydrophobic groups can associate with themselves or with the hydrophobic groups of other substances, and thicken the aqueous medium as a result of these interactions.

The person skilled in the art is aware that the solubility of hydrophobically associating (co)polymers in water may be more or less strongly dependent on the pH, depending on the nature of the monomers used. The reference point for the assessment of water solubility will therefore in each case be the pH desired for the respective end use of the copolymer.

Monomer (a)

The inventive hydrophobically associating copolymer comprises at least one monoethylenically unsaturated monomer (a) which imparts hydrophobically associating properties to the inventive copolymer and is therefore referred to hereinafter as hydrophobically associating monomer.

According to the invention, at least one of the hydrophobically associating monomers (a) is a monomer of the general formula (I)

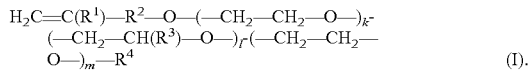

$$H_2C=C(R^1)-R^2-O-(-CH_2-CH_2-O-)_k-(-CH_2-CH(R^3)-O-)_l-(-CH_2-CH_2-O-)_m-R^4 \quad (I).$$

In the monomers (a) of the general formula (I), an ethylenic group $H_2C=C(R^1)-$ is bonded via a divalent linking group $-R^2-O-$ to a polyalkyleneoxy radical having block structure $-(-CH_2-CH_2-O-)_k-(-CH_2-CH(R^3)-O-)_l-R^4$, where the blocks $-(-CH_2-CH_2-O-)_k$ and $-(-CH_2-CH(R^3)-O-)_l$ are arranged in the sequence shown in formula (I). Optionally, the monomer (a) of the formula (I) may have a further polyethyleneoxy block $-(-CH_2-CH_2-O-)_m$. The polyalkyleneoxy radical has either a terminal OH group or a terminal ether group $OR^4$.

In the abovementioned formula, $R^1$ is H or a methyl group. Preferably, $R^1$ is H.

$R^2$ is a single bond or a divalent linking group selected from the group of $-(C_nH_{2n})-$ and $-O-(C_nH_{2n'})-$. In the formulae mentioned, n is a natural number from 1 to 6 and n' a natural number from 2 to 6. In other words, the linking group comprises straight-chain or branched aliphatic hydrocarbyl groups which have 1 to 6 carbon atoms or 2 to 6 carbon atoms and are joined either directly or via an ether group $-O-$ to the ethylenic group $H_2C=C(R^1)-$. The $-(C_nH_{2n})-$, and $-(C_nH_{2n'})$ groups are preferably linear aliphatic hydrocarbyl groups.

Preferably, the $R^2$ group $=-(C_nH_{2n})-$ is a group selected from $-CH_2-$, $-CH_2-CH_2-$ and $-CH_2-CH_2-CH_2-$, particular preference being given to a methylene group $-CH_2-$.

Preferably, the $R^2$ group $=-O-(C_nH_{2n'})-$ is a group selected from $-O-CH_2-CH_2-$, $-O-CH_2-CH_2-CH_2-$ and $-O-CH_2-CH_2-CH_2-CH_2-$, particular preference being given to $-O-CH_2-CH_2-CH_2-CH_2-$.

More preferably, the $R^2$ group is a $-O-(C_nH_{2n'})-$ group.

In addition, $R^2$ is more preferably a group selected from $-CH_2-$ and $-O-CH_2-CH_2-CH_2-CH_2-$, very particular preference being given to $-O-CH_2-CH_2-CH_2-CH_2-$.

The monomers (a) additionally have a polyalkyleneoxy radical consisting of the units $-(-CH_2-CH_2-O-)_k$, $-(-CH_2-CH(R^3)-O-)_l$ and optionally $-(-CH_2-CH_2-O-)_m$, the units being arranged in block structure in the sequence shown in formula (I). The transition between the blocks may be abrupt or else continuous.

The number of ethyleneoxy units k is a number from 15 to 35, preferably from 20 to 28, more preferably from 23 to 26.

Preferably, the number of ethyleneoxy units k is a number from 23 to 26. It will be apparent to the person skilled in the art in the field of polyalkylene oxides that the numbers mentioned are mean values of distributions.

In the second block $-(-CH_2-CH(R^3)-O-)_l-$, the $R^3$ radicals are each independently hydrocarbyl radicals having at least 2 carbon atoms, preferably having 2 to 14 carbon atoms, preferably 2 to 4, and more preferably having 2 or 3 carbon atoms. This may be an aliphatic and/or aromatic, linear or branched carbon radical. Preference is given to aliphatic radicals. Particular preference is given to an aliphatic unbranched hydrocarbyl radical having 2 or 3 carbon atoms. The block mentioned is preferably a polybutyleneoxy block or a polypentyleneoxy block.

Examples of suitable $R^3$ radicals comprise ethyl, n-propyl, n-butyl, n-pentyl, n-hexyl, n-heptyl, n-octyl, n-nonyl, n-decyl, n-dodecyl, n-tetradecyl, and phenyl.

Examples of suitable $R^3$ radicals comprise ethyl, n-propyl, n-butyl, n-pentyl, n-hexyl, n-heptyl, n-octyl, n-nonyl or n-decyl and phenyl. Examples of preferred radicals comprise n-propyl, n-butyl, n-pentyl, particular preference being given to an ethyl radical or an n-propyl radical.

The $R^3$ radicals may additionally be ether groups of the general formula $-CH_2-O-R^{3'}$ where $R^{3'}$ is an aliphatic and/or aromatic, linear or branched hydrocarbyl radical having at least 2 carbon atoms, preferably 2 to 10 carbon atoms and more preferably at least 3 carbon atoms. Examples of $R^{3'}$ radicals comprise n-propyl, n-butyl, n-pentyl, n-hexyl, 2-ethylhexyl, n-heptyl, n-octyl, n-nonyl, n-decyl or phenyl.

Examples of $R^{3'}$ radicals comprise n-propyl, n-butyl, n-pentyl, n-hexyl, 2-ethylhexyl, n-heptyl, n-octyl, n-nonyl, n-decyl, n-dodecyl, n-tetradecyl or phenyl.

The block $-(-CH_2-CH(R^3)-O-)_l-$ is thus a block which consists of alkyleneoxy units having at least 4 carbon atoms, preferably having 4 or 5 carbon atoms, and/or glycidyl ethers having an ether group of at least 2, preferably at least 3, carbon atoms. Preferred $R^3$ radicals are the hydrocarbyl radicals mentioned; the units in the second block are more preferably alkyleneoxy units comprising at least 4 carbon atoms, such as butyleneoxy and pentyleneoxy units or units of higher alkylene oxides, most preferably butylene oxide or pentyleneoxy units.

It will be apparent to the person skilled in the art in the field of polyalkylene oxides that the orientation of the hydrocarbyl radicals $R^3$ may depend on the conditions in the alkoxylation, for example on the catalyst selected for the alkoxylation. The alkyleneoxy groups can thus be incorporated into the monomer in the orientation $-(-CH_2-CH(R^3)-O-)-$ or else the inverse orientation $-(-CH(R^3)-CH_2-O-)_l-$. The representation in formula (I) shall therefore not be regarded as being restricted to a particular orientation of the $R^3$ group.

The number of alkyleneoxy units l is a number from 5 to 30, preferably from 5 to 28, preferably from 5 to 25, preferably from 7 to 23, preferably from 7 to 18, especially preferably from 8.5 to 17.25 with the proviso that the sum total of the carbon atoms in all hydrocarbyl radicals $R^3$ or $R^{3'}$ is in the range from 15 to 60, preferably from 15 to 56, preferably 15 to 50, preferably from 25.5 to 34.5. If the $R^3$ radicals are an ether group —$CH_2$—O—$R^{3'}$, the proviso applies that the sum total of the hydrocarbyl radicals $R^{3'}$ is in the range from 15 to 60, preferably from 15 to 56, preferably from 15 to 50, more preferred from 25.5 to 34.5, not including the carbon atom in the linking —$CH_2$—O— group in —$CH_2$—O—$R^{3'}$.

A preferred embodiment relates to an above-described copolymer comprising a monomer (a) where $R^3$ is ethyl and l is a number from 7.5 to 28, preferably from 7.5 to 25, more preferably from 12.75 to 25, especially preferably from 13 to 23, especially preferably from 12.75 to 17.25, for example 14, 16 or 22.

In a preferred embodiment the number of alkyleneoxy units l is a number from 8.5 to 17.25, with the proviso that the sum total of the carbon atoms in all hydrocarbyl radicals $R^3$ or $R^{3'}$ is in the range from 25.5 to 34.5. If the $R^3$ radicals are an ether group —$CH_2$—O—$R^{3'}$, the proviso applies that the sum total of the hydrocarbyl radicals $R^{3'}$ is in the range from 25.5 to 34.5, not including the carbon atom in the linking —$CH_2$—O— group in —$CH_2$—O—$R^{3'}$. A preferred embodiment relates to an above-described copolymer comprising a monomer (a) where $R^3$ is ethyl and l is a number from 12.75 to 17.25, especially 13 to 17, for example 14 or 16. A further preferred embodiment relates to an above-described copolymer comprising a monomer (a) where $R^3$ is n-propyl and l is a number from 8.5 to 11.5, preferably 9 to 11, for example 10 or 11. It will be apparent to the person skilled in the art in the field of polyalkylene oxides that the numbers mentioned are mean values of distributions.

The optional block -(—$CH_2$—$CH_2$—O—)$_m$ is a polyethyleneoxy block. The number of ethyleneoxy units m is a number from 0 to 15, preferably from 0 to 10, more preferably 0.1 to 10, more preferably 0.1 to 5, especially preferably 0.5 to 5 and most preferably 0.5 to 2.5. It will be apparent to the person skilled in the art in the field of polyalkylene oxides that the numbers mentioned are mean values of distributions.

In a preferred embodiment of the invention, m is greater than 0 (i.e. the optional step c) is executed). In particular in this embodiment m is a number from 0.1 to 15, preferably from 0.1 to 10, more preferably from 0.5 to 10, especially preferably from 1 to 7, further preferably from 2 to 5. It will be apparent to the person skilled in the art in the field of polyalkylene oxides that the numbers mentioned are mean values of distributions.

The $R^4$ radical is H or a preferably aliphatic hydrocarbyl radical having 1 to 4 carbon atoms. $R^4$ is preferably H, methyl or ethyl, more preferably H or methyl and most preferably H.

In the monomers of the formula (I), a terminal, monoethylenic group is thus joined to a polyalkyleneoxy group with block structure, more specifically first to a hydrophilic block having polyethyleneoxy units and the latter in turn to a second hydrophobic block formed from alkyleneoxy units, preferably at least butyleneoxy units or units of higher alkylene oxides and more preferably from butyleneoxy or pentyleneoxy units. The second block may have a terminal —$OR^4$ group, especially an OH group. The end group need not be etherified with a hydrocarbyl radical for hydrophobic association; instead, the second block -(—$CH_2$—$CH(R^3)$—O—)$_l$ itself having the $R^3$ or $R^{3'}$ radicals is responsible for the hydrophobic association of the copolymers prepared using the monomers (a). Etherification is just one option which can be selected by the person skilled in the art according to the desired properties of the copolymer.

It will be apparent to the person skilled in the art in the field of polyalkyleneoxy block copolymers that the transition between the two blocks, according to the method of preparation, may be abrupt or else continuous. In the case of a continuous transition, there is a transition zone comprising monomers of both blocks between the blocks. If the block boundary is fixed in the middle of the transition zone, the first block -(—$CH_2$—$CH_2$—O—)$_k$ may correspondingly still have small amounts of —(—$CH_2$—$CH(R^3)$—O—)— units and the second block -(—$CH_2$—$CH(R^3)$—O—)$_l$ small amounts of -(—$CH_2$—$CH_2$—O—)— units, in which case these units, however, are not distributed randomly over the block but are arranged within the transition zone mentioned. More particularly, the optional third block (—$CH_2$—$CH_2$—O—)$_m$ may have small amounts of units -(—$CH_2$—$CH(R^3)$—O—)—.

The present invention relates to a process for preparing a macromonomer M of the formula (I) where the (—$CH_2$—$CH_2$—O—)$_k$ and (—$CH_2$—$CH(R^3)$—O—)$_l$ and optionally -(—$CH_2$—$CH_2$—O—)$_m$ units are arranged in block structure in the sequence shown in formula (I). "Block structure" in the context of the present invention means that the blocks are formed from the corresponding units to an extent of at least 85 mol %, preferably to an extent of at least 90 mol %, more preferably to an extent of at least 95 mol %, based on the total amount of the respective block. This means that the blocks, as well as the corresponding units, may have small amounts of other units (especially other polyalkyleneoxy units). More particularly, the optional polyethyleneoxy block -(—$CH_2$—$CH_2$—O—)$_m$ comprises at least 85 mol %, preferably at least 90 mol %, based on the total amount of the block, the unit (—$CH_2$—$CH_2$—O—). More particularly, the optional polyethyleneoxy block -(—$CH_2$—$CH_2$—O—)$_m$ consists of 85 to 95 mol % of the unit (—$CH_2$—$CH_2$—O—) and of 5 to 15 mol % of the unit (—$CH_2$—$CH(R^3)$—O—).

The invention preferably relates to a copolymer in which the radicals and indices are each defined as follows:
k: is a number from 15 to 35, preferably from 20 to 28, preferably from 23 to 26;
l: is a number from 5 to 30, preferably from 5 to 28, preferably from 5 to 25;
m: is a number from 0 to 15, preferably 0 or preferably from 0.5 to 10;
$R^1$: is H;
$R^2$: is a divalent linking group —O—$(C_{n'}H_{2n'})$— where n' is 4;
$R^3$: is independently a hydrocarbyl radical having 2 carbon atoms, especially ethyl;
$R^4$: is H.

The invention preferably relates to a copolymer in which the radicals and indices are each defined as follows:
k: is a number from 15 to 35, preferably from 20 to 28, preferably from 23 to 26;
l: is a number from 5 to 30, preferably from 5 to 28, preferably from 5 to 25;
m: is a number from 0.1 to 10, preferably from 0.5 to 10, especially preferably from 2 to 5;
$R^1$: is H;
$R^2$: is a divalent linking group —O—$(C_{n'}H_{2n'})$— where n' is 4;

$R^3$: is independently a hydrocarbyl radical having 2 carbon atoms, especially ethyl;
$R^4$: is H.

The invention preferably relates to a copolymer in which the radicals and indices are each defined as follows:
k: is a number from 15 to 35, preferably from 20 to 28, preferably from 23 to 26;
l: is a number from 7.5 to 28, preferably from 7.5 to 25, more preferably from 12.75 to 25; especially preferably from 13 to 23, for example 14, 16 or 22;
m: is a number from 0 to 15, preferably 0 or preferably 0.5 to 10;
$R^1$: is H;
$R^2$: is a divalent linking group —O—$(C_nH_{2n'})$— where n' is 4;
$R^3$: is independently a hydrocarbyl radical having 2 carbon atoms, especially ethyl;
$R^4$: is H.

The invention preferably relates to a copolymer in which the radicals and indices are each defined as follows:
k: is a number from 15 to 35, preferably from 20 to 28, preferably from 23 to 26;
l: is a number from 7.5 to 28, preferably from 7.5 to 25, more preferably from 12.75 to 25; especially preferably from 13 to 23, for example 14, 16 or 22;
m: is a number from 0.1 to 10, preferably from 0.5 to 10, more preferably from 2 to 5;
$R^1$: is H;
$R^2$: is a divalent linking group —O—$(C_nH_{2n'})$— where n' is 4;
$R^3$: is independently a hydrocarbyl radical having 2 carbon atoms, especially ethyl;
$R^4$: is H.

The invention preferably relates to a copolymer in which the radicals and indices are each defined as follows:
k: is a number from 23 to 26;
l: is a number from 12.75 to 17.25;
m: is a number from 0 to 15, preferably 0 or preferably 0.5 to 10;
$R^1$: is H;
$R^2$: is a divalent linking group —O—$(C_nH_{2n'})$— where n' is 4;
$R^3$: is independently a hydrocarbyl radical having 2 carbon atoms, especially ethyl;
$R^4$: is H.

In addition, the invention preferably relates to a copolymer in which the radicals and indices are each defined as follows:
k: is a number from 23 to 26;
l: is a number from 8.5 to 11.5;
m: is a number from 0 to 15, preferably 0 to 10; preferably 0 or preferably 0.5 to 10;
$R^1$: is H;
$R^2$: is a divalent linking group —O—$(C_nH_{2n'})$— where n' is 4;
$R^3$: is a hydrocarbyl radical having 3 carbon atoms, especially n-propyl;
$R^4$: is H.

In addition, the invention preferably relates to a copolymer in which the monomer (a) of the formula (I) is a mixture of a monomer (a) of the formula (I) where m=0 and a monomer (a) of the formula (I) where m=1 to 15, preferably 1 to 10. In addition, the invention preferably relates to a copolymer in which the weight ratio of the monomer (a) of the formula (I) where m=0 and the monomer (a) of the formula (I) where m=1 to 15, preferably 1 to 10, is in the range from 19:1 to 1:19, preferably in the range from 9:1 to 1:9. This mixture of monomer (a) of the formula (I) where m=0 and monomer (a) of the formula (I) where m=1 to 15 more preferably gives rise to a mean value (averaged over all monomers (a) in the mixture) in the range from m=0.1 to 10, preferably from 0.1 to 5, more preferably from 0.5 to 5, more preferably from 0.5 to 2.5.

Further, this mixture of monomer (a) of the formula (I) where m=0 and monomer (a) of the formula (I) where m=1 to 15 more preferably gives rise to a mean value (averaged over all monomers (a) in the mixture) in the range from m=0.1 to 10, preferably from 0.1 to 5, more preferably from 0.5 to 5, more preferably from 0.5 to 3.5, more preferably from 0.5 to 2.5.

In general, an ethoxylation of the alkoxylated alcohol A3 in step c) will be effected preferentially on already ethoxylated chains, since the primary alkoxide group is more active compared to the secondary alkoxide group of the alcohol A3. Thus, more particularly, after step c), there may be a mixture of chains having a terminal ethyleneoxy block -(—$CH_2$—$CH_2$—O—$)_m$ comprising at least one unit (monomers of the formula (I)), and chains which do not have a terminal ethyleneoxy block -(—$CH_2$—$CH_2$—O—$)_m$ (monomers of the formula (III)).

Preparation of the Monomers (a) of the Formula (I)

The monomers (a) of the general formula (I)

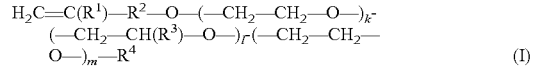

are prepared in the steps described above. The preferred embodiments of monomer (a) correspond to those already specified above.

Step a) of the process according to the invention comprises the reaction of a monoethylenically unsaturated alcohol A1 with ethylene oxide, with addition of an alkaline catalyst C1 comprising KOMe (potassium methoxide) and/or NaOMe (sodium methoxide), to obtain an alkoxylated alcohol A2.

The preferred conditions specified hereinafter (for example pressure and/or temperature ranges) in the reactions in step a), b), c) and/or d) mean that the respective step is performed wholly or partly under the given conditions.

Step a) preferably first comprises the reaction of the monoethylenically unsaturated alcohol A1 with the alkaline catalyst C1. Typically, the alcohol A1 used as the starting material for this purpose is admixed in a pressure reactor with an alkaline catalyst C1. Reduced pressure of typically less than 100 mbar, preferably in the range from 50 to 100 mbar and/or temperature elevated typically to 30 to 150° C. allow water and/or low boilers still present in the mixture to be drawn off. Thereafter, the alcohol is present essentially in the form of the corresponding alkoxide. Subsequently, the reaction mixture is typically treated with inert gas (e.g. nitrogen).

Step a) also preferably first comprises the reaction of the monoethylenically unsaturated alcohol A1 with the alkaline catalyst C1. Typically, the alcohol A1 used as the starting material for this purpose is admixed in a pressure reactor with an alkaline catalyst C1. Reduced pressure of typically less than 100 mbar, preferably in the range from 30 to 100 mbar and/or temperature elevated typically to 30 to 150° C. allow water and/or low boilers still present in the mixture to be drawn off. Thereafter, the alcohol is present essentially in the form of the corresponding alkoxide. Subsequently, the reaction mixture is typically treated with inert gas (e.g. nitrogen).

Step a) preferably comprises the addition of ethylene oxide to the above-described mixture of alcohol A1 with the alkaline catalyst C1 (as described above). After the addition of ethylene oxide has ended, the reaction mixture is typically allowed to react further. The addition and/or further reaction is effected typically over a period of 2 to 36 h, preferably of 5 to 24 h, especially preferably of 5 to 15 h, more preferably of 5 to 10 h.

Step a) preferably comprises the addition of ethylene oxide to the above-described mixture of alcohol A1 with the alkaline catalyst C1 (as described above). After the addition of ethylene oxide has ended, the reaction mixture is typically allowed to react further. The further reaction is typically effected over a period of 0.1 to 1 h. The addition including optional decompression (intermediate reduction of the pressure for example from 6 to 3 bar absolute) and including further reaction is effected for example over a period of 2 to 36 h, preferably of 5 to 24 h, especially preferably of 5 to 15 h, more preferably of 5 to 10 h.

Step a) is effected typically at temperatures of 60 to 180° C., preferably of 130 to 150° C., more preferably of 140 to 150° C. More particularly, step a) comprises the addition of ethylene oxide to the mixture of alcohol A1 with the alkaline catalyst C1 at a temperature of 60 to 180° C., preferably of 130 to 150° C., more preferably of 140 to 150° C.

The ethylene oxide is preferably added to the mixture of alcohol A1 and alkaline catalyst C1 at a pressure in the range from 1 to 7 bar, preferably in the range from 1 to 5 bar. In order to satisfy the safety regulations, the addition in step a) is typically performed at a pressure in the range from 1 to 3.1 bar. More particularly, the addition of ethylene oxide and/or the further reaction are performed under the abovementioned conditions.

The ethylene oxide is preferably added to the mixture of alcohol A1 and alkaline catalyst C1 at a pressure in the range from 1 to 7 bar, preferably in the range from 1 to 6 bar. In order to satisfy the safety regulations, the addition in step a) is typically performed at a pressure in the range from 1 to 4 bar, preferably from 1 to 3.9 bar, more preferably from 1 to 3.1 bar or in a further embodiment of the invention from 3 to 6 bar. More particularly, the addition of ethylene oxide and/or the further reaction are performed under the abovementioned conditions.

Step a) preferably comprises the addition of ethylene oxide to a mixture of alcohol A1 and alkaline catalyst C1 over a period of less than or equal to 36 h, preferably less than or equal to 32 h, more preferably over a period of 2 to 32 h, and at a pressure of less than or equal to 5 bar, preferably at 1 to 3.1 bar. More particularly, the above-specified period comprises the addition of ethylene oxide and/or the further reaction.

Step a) preferably comprises the addition of ethylene oxide to a mixture of alcohol A1 and alkaline catalyst C1 over a period of less than or equal to 36 h, preferably less than or equal to 32 h, more preferably over a period of 2 to 32 h, and at a pressure of less than or equal to 5 bar, preferably less than 1 to 4 bar, especially preferably at 1 to 3.9 bar, preferably at 1 to 3.1 bar. More particularly, the above-specified period comprises the addition of ethylene oxide and/or the further reaction.

More particularly, the reaction of a monoethylenically unsaturated alcohol A1 with ethylene oxide, with addition of an alkaline catalyst C1 comprising KOMe (potassium methoxide) and/or NaOMe (sodium methoxide), in step a) of the process according to the invention can be effected in one or more ethoxylation steps. Preference is given to a process as described above wherein step a) comprises the following steps:

reaction of the monoethylenically unsaturated alcohol A1 with the alkaline catalyst C1, reaction of the mixture of alcohol A1 and catalyst C1 with a portion of the ethylene oxide, especially 10 to 50% by weight, especially 10 to 30% by weight, of the total amount of ethylene oxide, an intermediate step comprising a rest phase and/or a decompression and reaction with the remaining portion of the ethylene oxide.

Preference is further given to a process as described above wherein step a) comprises the following steps:

reaction of the monoethylenically unsaturated alcohol A1 with the alkaline catalyst C1, reaction of the mixture of alcohol A1 and catalyst C1 with a portion of the ethylene oxide, especially 50 to 98% by weight, especially 80 to 98% by weight, of the total amount of ethylene oxide, a step for removal of low boilers, with decompression to a pressure less than 100 mbar, preferably 50 to 100 mbar, and/or elevated temperature, typically within the range from 30 to 150° C., reaction of the resulting ethoxylation product with the alkaline catalyst C1 and reaction of the remaining portion of the ethylene oxide with the mixture of ethoxylation product and alkaline catalyst C1.

Preference is further given to a process as described above wherein step a) comprises the following steps:

reaction of the monoethylenically unsaturated alcohol A1 with the alkaline catalyst C1, reaction of the mixture of alcohol A1 and catalyst C1 with a portion of the ethylene oxide, especially 50 to 98% by weight, especially 80 to 98% by weight, of the total amount of ethylene oxide, a step for removal of low boilers, with decompression to a pressure less than 100 mbar, preferably 30 to 100 mbar, and/or elevated temperature, typically within the range from 30 to 150° C., reaction of the resulting ethoxylation product with the alkaline catalyst C1 and reaction of the remaining portion of the ethylene oxide with the mixture of ethoxylation product and alkaline catalyst C1.

The alkaline catalyst C1 comprises especially 10 to 100% by weight KOMe and/or NaOMe, preferably 20 to 90% by weight. The catalyst C1 may, as well as KOMe and/or NaOMe, comprise further alkaline compounds and/or a solvent (especially a C1 to C6 alcohol). For example, a compound selected from alkali metal hydroxides, alkaline earth metal hydroxides, alkali metal alkoxides (C2 to C6 potassium alkoxides, C2 to C6 sodium alkoxides, preferably ethoxide), alkaline earth metal alkoxides (especially C1 to C6 alkoxides, preferably methoxide and/or ethoxide) may be present. The catalyst C1 preferably comprises, as well as KOMe and/or NaOMe, at least one further alkaline compound selected from sodium hydroxide and potassium hydroxide. In another preferred embodiment, the alkaline catalyst C1 consists of KOMe or of a mixture of KOMe and methanol (MeOH). Typically, it is possible to use a solution of 20 to 50% by weight of KOMe in methanol (MeOH).

In a further preferred embodiment, the alkaline catalyst C1 consists of NaOMe or of a mixture of NaOMe and methanol (MeOH). Typically, a solution of 20 to 50% by weight NaOMe in methanol (MeOH) may be used.

In a further preferred embodiment, the alkaline catalyst C1 consists of a mixture of KOMe and NaOMe or a solution of KOMe and NaOMe in methanol.

If the basic catalyst C1 used in the reaction in step a) is KOMe, it is advantageous to use C1 in such an amount that an upper limit of 2500 ppm (approx. 0.4 mol %) of KOMe is maintained in relation to the alcohol A1 used, in order to avoid the decomposition of the monoethylenically unsaturated alcohol A1. The concentration of potassium ions in step a) is preferably less than or equal to 0.4 mol % based on the total amount of the alcohol A1 used, more preferably 0.1 to 0.4 mol %.

If KOMe is added in such an amount that the concentration is more than 0.9 mol % based on the ethoxylated alcohol A2 (product of process step a)), KOMe has to be fully or partly removed prior to step b), in order to obtain a potassium ion concentration of less than 0.9 mol % in process step b). This can be effected, for example, by isolating and optionally purifying the ethoxylated alcohol A2 after step a).

In a further preferred embodiment, KOMe is used in such an amount that the concentration of potassium ions after the reaction in step a) is already less than or equal to 0.9 mol % based on A2.

Step b) of the process according to the invention comprises the reaction of the ethoxylated alcohol A2 with at least one alkylene oxide Z, with addition of an alkaline catalyst C2, to obtain an alkoxylated alcohol A3 corresponding to the monomer (a) of formula (III)

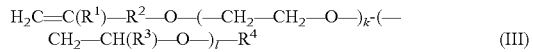

where $R^4$=H.

Step b) preferably first comprises the reaction of the ethoxylated alcohol A2 with the alkaline catalyst C2. Typically, the alcohol A2, for this purpose, is admixed in a pressure reactor with the alkaline catalyst C2. Reduced pressure of typically less than 100 mbar, preferably in the range from 50 to 100 mbar and/or elevated temperature typically in the range from 30 to 150° C. allow water and/or low boilers still present in the mixture to be drawn off. Thereafter, the alcohol is present essentially in the form of the corresponding alkoxide. Subsequently, the reaction mixture is typically treated with inert gas (e.g. nitrogen).

Step b) also preferably first comprises the reaction of the ethoxylated alcohol A2 with the alkaline catalyst C2. Typically, the alcohol A2, for this purpose, is admixed in a pressure reactor with the alkaline catalyst C2. Reduced pressure of typically less than 100 mbar, preferably in the range from 30 to 100 mbar and/or elevated temperature typically in the range from 30 to 150° C. allow water and/or low boilers still present in the mixture to be drawn off. Thereafter, the alcohol is present essentially in the form of the corresponding alkoxide. Subsequently, the reaction mixture is typically treated with inert gas (e.g. nitrogen).

Step b) preferably comprises the addition of the at least one alkylene oxide Z to the above-described mixture of alcohol A2 with alkaline catalyst C2. After the addition of the alkylene oxide Z has ended, the reaction mixture is typically allowed to react further. The addition and/or further reaction is effected typically over a period of 2 to 36 h, preferably of 5 to 24 h, especially preferably of 5 to 20 h, more preferably of 5 to 15 h.

Step b) preferably comprises the addition of the at least one alkylene oxide Z to the above-described mixture of alcohol A2 with alkaline catalyst C2. After the addition of the alkylene oxide Z has ended, the reaction mixture is typically allowed to react further. The addition including optional decompression an including further reaction is effected typically over a period of 2 to 36 h, preferably of 5 to 30 h, especially preferably of 10 to 28 h, more preferably of 11 to 24 h.

According to the invention, the concentration of potassium ions in the reaction in step b) is less than or equal to 0.9 mol %, preferably less than 0.9 mol %, preferably from 0.01 to 0.9 mol %, more preferably from 0.1 to 0.6 mol %, based on the alcohol A2 used. Preferably, the concentration of potassium ions in the preparation of monomer (a), in the reaction in step b), is 0.01 to 0.5 mol % based on the alcohol A2 used.

In a particularly preferred embodiment, the concentration of potassium ions in the reaction in step b) is 0.1 to 0.5 mol % and the reaction in step b) is performed at temperatures of 120 to 130° C.

The alkaline catalyst C2 preferably comprises at least one alkaline compound selected from alkali metal hydroxides, alkaline earth metal hydroxides, alkali metal alkoxides (especially C1 to C6 alkoxides, preferably methoxide and/or ethoxide), alkaline earth metal alkoxides (especially C1 to C6 alkoxides, preferably methoxide and/or ethoxide). The catalyst preferably comprises at least one basic sodium compound, especially selected from NaOH, NaOMe and NaOEt, more preferably NaOMe or NaOH. The catalyst C2 used may be a mixture of the alkaline compounds mentioned; the catalyst C2 preferably consists of one of the basic compounds mentioned or mixtures of the alkaline compounds mentioned. Frequently, an aqueous solution of the alkaline compounds is used. In another preferred embodiment, the alkaline catalyst C1 consists of NaOMe or of a mixture of NaOMe and methanol. Typically, a solution of 20 to 50% by weight NaOMe in methanol may be used. The catalyst C2 preferably does not comprise any KOMe.

Preferably, the preparation in step b) involves using a catalyst C2 comprising at least one basic sodium compound, especially selected from NaOH, NaOMe and NaOEt, the concentration of sodium ions in the reaction in step b) being 3.5 to 12 mol %, preferably 3.5 to 7 mol %, more preferably 4 to 5.5 mol %, based on the alcohol A2 used.

According to the invention, the reaction in step b) is performed at a temperature less than or equal to 135° C. Preference is given to performing the reaction in step b) at temperatures of 60 to 135° C., preferably at 100 to 135° C., more preferably at 120 to 130° C. More particularly, step b) comprises the addition of the at least one alkylene oxide Z to a mixture of alcohol A2 with alkaline catalyst C2 at a temperature of less than or equal to 135° C., preferably at temperatures of 60 to 135° C., more preferably at 100 to 135° C., more preferably at 120 to 135° C.

Preference is given to performing step b) at a pressure in the range from 1 to 3.1 bar, preferably from 1 to 2.1 bar. In order to satisfy the safety conditions, the reaction in step b) is preferably performed at a pressure in the range of less than or equal to 3.1 bar (preferably 1 to 3.1 bar) if $R^3$ is a hydrocarbyl radical having 2 carbon atoms, or performed at a pressure of less than or equal to 2.1 bar (preferably 1 to 2.1 bar) if $R^3$ is a hydrocarbyl radical having more than 2 carbon atoms.

Further preference is given to performing step b) at a pressure in the range from 1 to 6 bar, preferably from 1 to 3.1 bar, preferably from 1 to 2.1 bar. The reaction in step b) is preferably performed at a pressure in the range of from 1 to 6 bar, preferably from 1 to 3.1 bar, preferably from 4 to 6 bar, if $R^3$ is a hydrocarbyl radical having 2 carbon atoms. Especially, the addition of alkylene oxide Z and/or the further reaction are performed under the abovementioned pressures.

More particularly, the present invention relates to a copolymer where $R^3$ is a hydrocarbyl radical having 2 carbon atoms and step b) in the preparation of monomer (a) is performed at a pressure in the range from 1 to 3.1 bar; or where $R^3$ is a hydrocarbyl radical having at least 3 carbon atoms (preferably having 3 carbon atoms) and step b) in the preparation of monomer (a) is performed at a pressure of 1 to 2.1 bar.

More particularly, the addition of alkylene oxide Z and/or the further reaction are performed at the abovementioned pressure. Step b) preferably comprises the addition of the at least one alkylene oxide Z to a mixture of alcohol A2 and alkaline catalyst K2 at a pressure in the range of less than or equal to 3.1 bar (preferably 1 to 3.1 bar) if $R^3$ is a hydrocarbyl radical having 2 carbon atoms, or at a pressure of less than or equal to 2.1 bar (preferably 1 to 2.1 bar) if $R^3$ is a hydrocarbyl radical having at least 3 carbon atoms.

Step b) preferably comprises the addition of the at least one alkylene oxide Z to a mixture of alcohol A2 with alkaline catalyst C2 over a period of less than or equal to 36 h, preferably less than or equal to 32 h, more preferably over a period of 2 to 32 h, most preferably over a period of 5 to 24 h, and at a pressure of less than or equal to 3.1 bar, preferably at 1 to 2.1 bar (additionally preferably at the abovementioned pressures).

Step b) also preferably comprises the addition of the at least one alkylene oxide Z to a mixture of alcohol A2 with alkaline catalyst C2 over a period of less than or equal to 36 h, preferably less than or equal to 32 h, more preferably over a period of 2 to 32 h, most preferably over a period of 11 to 24 h, and at a pressure of less than or equal to 3.1 bar (additionally preferably at the abovementioned pressures).

Particular preference is given to performing step b) at a pressure in the range from 1 to 3.1 bar (preferably at the abovementioned pressures) and at a temperature of 120 to 130° C.

The process according to the invention may optionally comprise step c), wherein at least a portion of the alkoxylated alcohol A3 is reacted with ethylene oxide to obtain an alkoxylated alcohol A4 which corresponds to the monomer (a) of the formula (I) where $R^4$=H and m>0, preferably 0 to 15, preferably 0 to 10, more preferably 0.1 to 10, more preferably 0.1 to 5, especially preferably around 0.5 to 5 and most preferably around 0.5 to 2.5. In a preferred embodiment, step c) comprises the reaction of all of the alkoxylated alcohol A3 with ethylene oxide.

According to a preferred embodiment of the invention the process comprises step c), wherein at least a portion of the alkoxylated alcohol A3 (preferably all of the alkoxylated alcohol A3) is reacted with ethylene oxide to obtain an alkoxylated alcohol A4 which corresponds to the macromonomer M of the formula (I) where $R^4$=H and m is a number from 0.1 to 15, preferably from 0.1 to 10, more preferably from 0.5 to 10, especially preferably from 1 to 7, further preferably from 2 to 5.

The optional step c) is especially effected without further addition of an alkaline catalyst. The optional step c) is especially performed at a pressure in the range from 1 to 7 bar, preferably from 1 to 5 bar, and a temperature in the range from 60 to 140° C., preferably from 120 to 140° C., more preferably from 125 to 135° C. The ethoxylation in the optional step c) is especially effected over a period of 0.5 to 7 h, especially 0.5 to 5 h, preferably of 0.5 to 4 h.

The optional step c) is especially effected without further addition of an alkaline catalyst. The optional step c) is especially performed at a pressure in the range from 1 to 7 bar, preferably from 1 to 6 bar, and a temperature in the range from 60 to 140° C., preferably from 120 to 1400° C., more preferably from 120 to 135° C. The ethoxylation in the optional step c) is especially effected over a period of 0.5 to 7 h, especially 1 to 5 h, preferably of 1 to 4 h.

The optional step c) preferably comprises the addition of ethylene oxide to the reaction mixture after step b), comprising the alkoxylated alcohol A3 of the formula (III) without further workup and/or decompression. After the addition of the ethylene oxide has ended, the reaction mixture is typically allowed to react further. The addition and/or further reaction is effected typically over a period of 0.5 to 10 h, especially 0.5 to 7 h, especially 0.5 to 5 h, preferably of 0.5 to 4 h.

The optional step c) preferably comprises the addition of ethylene oxide to the reaction mixture after step b), comprising the alkoxylated alcohol A3 of the formula (III) without further workup and/or decompression. After the addition of the ethylene oxide has ended, the reaction mixture is typically allowed to react further. The addition including optional decompression and including further reaction is effected typically over a period of 0.5 to 10 h, especially 2 to 10 h, especially 4 to 8 h.

The particular intended effect of performance of the optional step c), i.e. of a final ethoxylation, is that alkylene oxide Z possibly still present in the reaction mixture after step b) is depleted and removed.

It is additionally possible to remove alkylene oxide Z which has not been depleted after step b) by a decompression and/or temperature increase after step b).

The process according to the invention may optionally comprise step d), wherein the alkoxylated alcohol A3 and/or A4 is etherified with a compound $R^4$—X where X is a leaving group, preferably selected from Cl, Br, I, —O—SO$_2$—CH$_3$ (mesylate), —O—SO$_2$—CF$_3$ (triflate) and —O—SO$_2$—CR$^4$.

If the alkoxylated alcohol A3 of the formula (III) and/or A4 of the formula (I) is to be etherified with a terminal OH group (i.e. $R^4$=H), this can also be accomplished with the customary alkylating agents known in principle to those skilled in the art, for example alkyl sulfates and/or alkyl halides. The compound $R^4$—X may typically comprise alkyl halides. For the etherification, it is also possible to use especially dimethyl sulfate or diethyl sulfate. Etherification is just one option which can be selected by the person skilled in the art according to the desired properties of the copolymer.

Hydrophilic Monomers (b)

Over and above the monomers (a), the inventive hydrophobically associating copolymer comprises at least one different monoethylenically unsaturated hydrophilic monomer (b). It will be appreciated that it is also possible to use mixtures of a plurality of different hydrophilic monomers (b).

The hydrophilic monomers (b) comprise, as well as an ethylenic group, one or more hydrophilic groups. These impart sufficient water solubility to the inventive copolymer owing to their hydrophilicity. The hydrophilic groups are especially functional groups comprising oxygen and/or nitrogen atoms. They may additionally comprise especially sulfur and/or phosphorus atoms as heteroatoms.

The monomers (b) are more preferably miscible with water in any ratio, but it is sufficient for execution of the invention that the inventive hydrophobically associating copolymer has the water solubility mentioned at the outset. In general, the solubility of the monomers (b) in water at room temperature should be at least 100 g/l, preferably at least 200 g/l and more preferably at least 500 g/l.

Examples of suitable functional groups comprise carbonyl groups >C=O, ether groups —O—, especially polyethyleneoxy groups —(CH$_2$—CH$_2$—O—)$_n$— where n is preferably a number from 1 to 200, hydroxyl groups —OH, ester groups —C(O)O—, primary, secondary or tertiary amino groups, ammonium groups, amide groups —C(O)—NH—, carboxamide groups —C(O)—NH$_2$ or acidic groups such as carboxyl groups —COOH, sulfo groups —SO$_3$H, phosphonic acid groups —PO$_3$H$_2$ or phosphoric acid groups —OP(OH)$_3$.

Examples of preferred functional groups comprise hydroxyl groups —OH, carboxyl groups —COOH, sulfo groups —SO$_3$H, carboxamide groups —C(O)—NH$_2$, amide groups —C(O)—NH— and polyethyleneoxy groups —(CH$_2$—CH$_2$—O—)$_n$—H where n is preferably a number from 1 to 200.

The functional groups may be attached directly to the ethylenic group, or else joined to the ethylenic group via one or more linking hydrocarbyl groups.

The hydrophilic monomers (b) are preferably monomers of the general formula H$_2$C=C(R$^5$)R$^6$ (IV) where R$^5$ is H or methyl and R$^6$ is a hydrophilic group or a group comprising one or more hydrophilic groups.

The R$^6$ groups are groups which comprise heteroatoms in such an amount that the water solubility defined at the outset is achieved.

Examples of suitable monomers (b) comprise monomers comprising acidic groups, for example monomers comprising —COOH groups such as acrylic acid or methacrylic acid, crotonic acid, itaconic acid, maleic acid or fumaric acid, monomers comprising sulfo groups such as vinylsulfonic acid, allylsulfonic acid, 2-acrylamido-2-methylpropanesulfonic acid (AMPS), 2-methacrylamido-2-methylpropanesulfonic acid, 2-acrylamidobutanesulfonic acid, 3-acrylamido-3-methylbutanesulfonic acid or 2-acrylamido-2,4,4-trimethylpentanesulfonic acid, or monomers comprising phosphonic acid groups such as vinylphosphonic acid, allylphosphonic acid, N-(meth)acrylamidoalkylphosphonic acids or (meth)acryloyloxyalkylphosphonic acids.

Mention should additionally be made of acrylamide and methacrylamide and derivatives thereof, for example N-methyl(meth)acrylamide, N,N'-dimethyl(meth)acrylamide and N-methylolacrylamide, N-vinyl derivatives such as N-vinylformamide, N-vinylacetamide, N-vinylpyrrolidone or N-vinylcaprolactam, and vinyl esters such as vinyl formate or vinyl acetate. N-Vinyl derivatives may, after polymerization, be hydrolyzed to vinylamine units, and vinyl esters to vinyl alcohol units.

Further examples comprise monomers comprising hydroxyl and/or ether groups, for example hydroxyethyl(meth)acrylate, hydroxypropyl(meth)acrylate, allyl alcohol, hydroxyvinyl ethyl ether, hydroxyvinyl propyl ether, hydroxyvinyl butyl ether or compounds of the formula H$_2$C=C(R$^1$)—O—(—CH$_2$—CH(R$^7$)—O—)$_b$—R$^8$ (V) where R$^1$ is as defined above and b is a number from 2 to 200, preferably 2 to 100. The R$^7$ radicals are each independently H, methyl or ethyl, preferably H or methyl, with the proviso that at least 50 mol % of the RB radicals are H. Preferably at least 75 mol % of the R$^7$ radicals are H, more preferably at least 90 mol %, and they are most preferably exclusively H. The R$^8$ radical is H, methyl or ethyl, preferably H or methyl. The individual alkyleneoxy units may be arranged randomly or in blocks. In the case of a block copolymer, the transition between the blocks may be abrupt or gradual.

Further suitable hydrophilic monomers (b) are described in WO 2011/133527 (page 15 lines 1-23).

The abovementioned hydrophilic monomers can of course be used not just in the acid or base form described, but also in the form of corresponding salts. It is also possible to convert acidic or basic groups to corresponding salts after the formation of the polymer. Preferably, the corresponding salts are alkali metal salts or ammonium salts, more preferably organic ammonium salts and especially preferably water-soluble organic ammonium salts.

Preference is given to a copolymer in which at least one of the monomers (b) is a monomer comprising acidic groups, the acidic groups being at least one group selected from the group of —COOH, —SO$_3$H and —PO$_3$H, and salts thereof.

At least one of the monomers (b) is preferably a monomer selected from the group of (meth)acrylic acid, vinylsulfonic acid, allylsulfonic acid and 2-acrylamido-2-methylpropanesulfonic acid (AMPS), more preferably acrylic acid and/or APMS or salts thereof.

The invention preferably relates to a copolymer comprising at least two different hydrophilic monomers (b) which are
  at least one uncharged hydrophilic monomer (b1), and
  at least one hydrophilic anionic monomer (b2) comprising
    at least one acidic group selected from the group of —COOH, —SO$_3$H and —PO$_3$H$_2$ and salts thereof.

Examples of suitable monomers (b1) comprise acrylamide and methacrylamide, preferably acrylamide and derivatives thereof, for example N-methyl(meth)acrylamide, N,N'-dimethyl(meth)acrylamide and N-methylolacrylamide. Mention should additionally be made of N-vinyl derivatives such as N-vinylformamide, N-vinylacetamide, N-vinylpyrrolidone or N-vinylcaprolactam. Mention should additionally be made of monomers having OH groups such as hydroxyethyl(meth)acrylate, hydroxypropyl(meth)acrylate, allyl alcohol, hydroxyvinyl ethyl ether, hydroxyvinyl propyl ether or hydroxyvinyl butyl ether. The monomer (b1) in the inventive copolymer is preferably acrylamide or derivatives thereof, more preferably acrylamide.

Examples of anionic monomers (b2) comprise acrylic acid or methacrylic acid, crotonic acid, itaconic acid, maleic acid or fumaric acid, monomers comprising sulfo groups such as vinylsulfonic acid, allylsulfonic acid, 2-acrylamido-2-methylpropanesulfonic acid (AMPS), 2-methacrylamido-2-methylpropanesulfonic acid, 2-acrylamidobutanesulfonic acid, 3-acrylamido-3-methylbutanesulfonic acid or 2-acrylamido-2,4,4-trimethylpentanesulfonic acid, or monomers comprising phosphonic acid groups such as vinylphosphonic acid, allylphosphonic acid, N-(meth)acrylamidoalkylphosphonic acids or (meth)acryloyloxyalkylphosphonic acids.

Examples of preferred anionic monomers (b2) comprise acrylic acid, vinylsulfonic acid, allylsulfonic acid, 2-acrylamido-2-methylpropanesulfonic acid (AMPS), 2-acrylamidobutanesulfonic acid, 3-acrylamido-3-methylbutanesulfonic acid and 2-acrylamido-2,4,4-trimethylpentanesulfonic acid, very particular preference being given to 2-acrylamido-2-methylpropanesulfonic acid (AMPS).

The copolymer is preferably one comprising acrylamide as monomer (b1) and a monomer comprising acidic groups as monomer (b2).

The copolymer is preferably one comprising acrylamide as monomer (b1) and a monomer comprising acidic groups as monomer (b2), the acidic group being —SO$_3$H. The copolymer is especially preferably one comprising acrylamide as monomer (b1) and 2-acrylamido-2-methylpropanesulfonic acid (AMPS) as monomer (b2).

The copolymer is preferably one comprising acrylamide as monomer (b1) and acrylic acid as monomer (b2).

The copolymer is additionally preferably one comprising acrylamide as monomer (b1) and at least two further different monomers (b2) comprising acidic groups. The copolymer is especially preferably one comprising acrylamide as monomer (b1) and a monomer comprising the —$SO_3H$ group and a monomer comprising the —COOH group as monomer (b2) comprising acidic groups.

The copolymer is additionally preferably one comprising acrylamide as monomer (b1), and 2-acrylamido-2-methylpropanesulfonic acid (AMPS) and a monomer comprising the —COOH group as monomer (b2). The copolymer is additionally preferably one comprising acrylamide as monomer (b1), and 2-acrylamido-2-methylpropanesulfonic acid (AMPS) and acrylic acid as monomer (b2). The amount of the monomers (b) in the inventive copolymer is 25 to 99.9% by weight based on the total amount of all monomers in the copolymer, preferably 25 to 99.5% by weight. The exact amount is guided by the nature and the desired end use of the hydrophobically associating copolymers and is fixed accordingly by the person skilled in the art.

The invention preferably relates to a copolymer comprising
  (a) 2% by weight of at least one hydrophobically associating monomer (a), and
  (b) 50% by weight of acrylamide as an uncharged hydrophilic monomer (b1), and
  (c) 48% by weight of acrylamido-2-methylpropanesulfonic acid (AMPS) as an anionic hydrophilic monomer (b2),
where the stated amounts are each based on the total amount of all monomers in the copolymer.

Nonpolymerizable Surface-Active Components (c)

The inventive copolymers are prepared in the presence of at least one nonpolymerizable surface-active compound which is preferably at least one nonionic surfactant. However, anionic and cationic surfactants are also suitable, provided that they do not take part in the polymerization reaction.

Component (c) is preferably at least one nonionic surfactant.

Component (c) may especially comprise surfactants, preferably nonionic surfactants of the general formula $R^{10}$—Y' where $R^{10}$ is a hydrocarbyl radical having 8 to 32, preferably 10 to 20 and more preferably 12 to 18 carbon atoms and Y' is a hydrophilic group, preferably a nonionic hydrophilic group, especially a polyalkoxy group.

The nonionic surfactant is preferably an ethoxylated long-chain aliphatic alcohol which has 10 to 20 carbon atoms and may optionally comprise aromatic moieties.

Examples include: $C_{12}C_{14}$-fatty alcohol ethoxylates, $C_{16}C_{18}$-fatty alcohol ethoxylates, $C_{13}$-oxo alcohol ethoxylates, $C_{10}$-oxo alcohol ethoxylates, $C_{13}C_{15}$-oxo alcohol ethoxylates, $C_{10}$-Guerbet alcohol ethoxylates and alkylphenol ethoxylates. Especially useful compounds have been found to be those having 5 to 20 ethyleneoxy units, preferably 8 to 18 ethyleneoxy units. It is optionally also possible for small amounts of higher alkyleneoxy units, especially propyleneoxy and/or butyleneoxy units, to be present, in which case, however, the amount as ethyleneoxy units should generally be at least 80 mol % based on all alkyleneoxy units.

Especially suitable surfactants are those selected from the group of the ethoxylated alkylphenols, the ethoxylated saturated iso-C13-alcohols and/or the ethoxylated C10-Guerbet alcohols, with presence in each case of 5 to 20 ethyleneoxy units, preferably 8 to 18 ethyleneoxy units, in the alkoxy radicals.

Preparation of the Hydrophobically Associating Copolymers

The inventive copolymers can be prepared by methods known in principle to those skilled in the art, by free-radical polymerization of the monomers (a) and (b), for example by bulk, solution, gel, emulsion, dispersion or suspension polymerization, preferably in the aqueous phase, although each of the possible polymerization variants must be performed in the presence of at least one component (c).

The present invention relates to a process for preparing an above-described inventive copolymer wherein at least one hydrophobically associating monomer (a) and at least one hydrophilic monomer (b) are subjected to an aqueous solution polymerization in the presence of at least one surface-active component (c), and wherein the monomer (a) of the general formula (I) is prepared by the above-described process.

In relation to the process for preparing the inventive copolymer, the preferred embodiments which have been described above in connection with the inventive copolymers apply.

The present invention preferably relates to a process for preparing the inventive copolymer, wherein the solution polymerization is performed at a pH of 5.0 to 7.5.

The monomers (a) of the formula (I) used in accordance with the invention are provided by the preparation process detailed above, by multistage alkoxylation of alcohols (II), optionally followed by an etherification. In relation to the process for preparing the monomer (a), the preferred embodiments which have been described above in connection with the inventive copolymers apply.

In a preferred embodiment, the preparation of the copolymer is undertaken by means of gel polymerization in the aqueous phase, provided that all monomers used have sufficient water solubility. For gel polymerization, a mixture of the monomers, initiators and other assistants with water or an aqueous solvent mixture is first provided. Suitable aqueous solvent mixtures comprise water and water-miscible organic solvents, the proportion of water generally being at least 50% by weight, preferably at least 80% by weight and more preferably at least 90% by weight. Organic solvents which should be mentioned here are especially water-miscible alcohols such as methanol, ethanol or propanol. Acidic monomers can be fully or partly neutralized prior to the polymerization. The concentration of all components except for the solvents is typically 25 to 60% by weight, preferably 30 to 50% by weight.

The mixture is subsequently polymerized photochemically and/or thermally, preferably at −5° C. to 50° C. If polymerization is effected thermally, preference is given to using polymerization initiators which initiate at comparatively low temperature, for example redox initiators. The thermal polymerization can be undertaken at room temperature or by heating the mixture, preferably to temperatures of not more than 50° C. The photochemical polymerization is typically undertaken at temperatures from −5 to 10° C. It is particularly advantageously possible to combine photochemical and thermal polymerization, by adding initiators both for thermal and for photochemical polymerization to the mixture. The polymerization here is first initiated photochemically at low temperatures, preferably −5 to +10° C. The heat of reaction released heats up the mixture and this additionally initiates the thermal polymerization. By means of this combination, it is possible to achieve a conversion of more than 99%.

Gel polymerization is generally effected without stirring. It can be effected batchwise, by irradiating the mixture in a suitable vessel with a path length of 2 to 20 cm and/or heating it. The polymerization gives rise to a firm gel. The polymerization may also be continuous. For this purpose, a polymerization apparatus having a conveyor belt to accommodate the mixture to be polymerized is used. The conveyor belt is equipped with devices for heating or for irradiation with UV radiation. In this method, the mixture is poured by means of a suitable apparatus onto one end of the belt, the mixture is polymerized in the course of transport in belt direction, and the firm gel can be removed at the other end of the belt.

After the polymerization, the gel is comminuted and dried. The drying should preferably be effected at temperatures below 100° C. To avoid conglutination, a suitable separating agent can be used for this step. The hydrophobically associating copolymer is obtained as a powder.

Further details regarding the performance of a gel polymerization are disclosed, for example, in DE 10 2004 032 304 A1, paragraphs [0037] to [0041].

Inventive copolymers in the form of alkali-soluble aqueous dispersions can preferably be prepared by means of emulsion polymerization. The performance of an emulsion polymerization using hydrophobically associating monomers is disclosed, for example, in WO 2009/019225, page 5 line 16 to page 8 line 13.

The inventive copolymers preferably have a number-average molecular weight Mn of 1 000 000 to 30 000 000 g/mol.

Use of the Hydrophobically Associating Copolymers

The inventive hydrophobically associating copolymers may, as already mentioned at the outset, be used in accordance with the invention to thicken aqueous phases.

The present invention relates to the use of the inventive copolymers in the development, exploitation and completion of underground mineral oil and natural gas deposits. More particularly, the use relates to the preferred embodiments which have been described above in connection with the inventive copolymers.

The copolymers can be used alone here, or else in combination with other thickening components, for example together with other thickening polymers. They can additionally be formulated, for example, together with surfactants to give a thickening system. The surfactants can form micelles in aqueous solution, and the hydrophobically associating copolymers together with the micelles can form a three-dimensional thickening network.

For use, the copolymer can be dissolved directly in the aqueous phase to be thickened. It is also conceivable to predissolve the copolymer and then to add the solution formed to the system to be thickened.

Through the selection of the type and amount of the monomers (a) and (b), and of component (c), it is possible to adjust the properties of the copolymers to the respective technical demands.

The inventive copolymers can be used, for example, in the mineral oil production sector as an additive for thickening of drilling muds and completion fluids.

In addition, the inventive copolymers find use as a thickener in hydraulic fracturing. This typically involves injecting a high-viscosity aqueous solution under high pressure into the oil- or gas-bearing formation stratum.

The invention preferably relates to the use of the inventive copolymers for tertiary mineral oil production, wherein an aqueous formulation of said copolymers in a concentration of 0.01 to 5% by weight is injected into a mineral oil deposit through at least one injection well and crude oil is withdrawn from the deposit through at least one production well.

The concentration of the copolymer should generally not exceed 5% by weight based on the sum of all constituents in the formulation and is typically 0.01 to 5% by weight, especially 0.1 to 5% by weight, preferably 0.5 to 3% by weight and more preferably 1 to 2% by weight.

The formulation is injected into the mineral oil deposit through at least one injection well, and crude oil is withdrawn from the deposit through at least one production well. The term "crude oil" in this context of course means not only single-phase oil; instead, the term also comprises the usual crude oil-water emulsions. In general, a deposit is provided with several injection wells and with several production wells. The formulation injected, called the "polymer flood", generates a pressure which causes the mineral oil to flow in the direction of the production well and to be produced via the production well. The viscosity of the flooding medium should be matched as far as possible to the viscosity of the mineral oil in the mineral oil deposit. The viscosity can especially be adjusted via the concentration of the copolymer. Polymer flooding involves using an aqueous formulation comprising not only water but also at least one hydrophobically associating copolymer. It is of course also possible to use mixtures of different copolymers. In addition, further components may of course also be used. Examples of further components comprise biocides, stabilizers or inhibitors. The formulation can preferably be prepared by initially charging the water and sprinkling the copolymer in as a powder. The aqueous formulation should be subjected to a minimum level of shear forces.

To increase the mineral oil yield, polymer flooding can advantageously be combined with other tertiary mineral oil production techniques.

The invention preferably relates to the use of the inventive copolymers in the development, exploitation and completion of underground mineral oil and natural gas deposits, especially for tertiary mineral oil production, the aqueous formulation of said copolymers comprising at least one surfactant.

In a further preferred embodiment of the invention, the "polymer flooding" using the inventive hydrophobically associating copolymers can be combined with a preceding "surfactant flooding".

This involves, prior to the polymer flooding, first injecting an aqueous surfactant formulation into the mineral oil formation. This reduces the interfacial tension between the formation water and the actual mineral oil, and thus increases the mobility of the mineral oil in the formation. The combination of the two techniques allows an increase in the mineral oil yield.

Examples of suitable surfactants for surfactant flooding comprise surfactants having sulfate groups, sulfonate groups, polyoxyalkylene groups, anionically modified polyoxyalkylene groups, betaine groups, glucoside groups or amine oxide groups, for example alkylbenzenesulfonates, olefinsulfonates or amidopropyl betaines. It is preferable to use anionic and/or betaine surfactants.

The person skilled in the art is aware of details of the industrial performance of polymer flooding and of surfactant flooding, and employs an appropriate technique according to the type of deposit.

It will be appreciated that it is also possible to use surfactants and the inventive copolymers in a mixture.

The following examples are intended to illustrate the invention in detail:

PART I: SYNTHESES

I-a Preparation of the Monomers (a)

Unless mentioned explicitly, the reactions were conducted in such a way that the target fill level at the end of the alkoxylation was about 65% of the reactor volume.

Example M1 HBVE-22 EO (0.4 Mol % of Potassium Ions)

A 2 l pressure autoclave with anchor stirrer was initially charged with 135.3 g (1.16 mol) of hydroxybutyl vinyl ether (HBVE) (stabilized with 100 ppm of potassium hydroxide (KOH)) and the stirrer was switched on. 1.06 g of potassium methoxide (KOMe) solution (32% KOMe in methanol (MeOH), corresponding to 0.0048 mol of potassium) were fed in and the stirred vessel was evacuated to a pressure less than 10 mbar, heated to 80° C. and operated at 80° C. and a pressure of less than 10 mbar for 70 min. MeOH was distilled off.

According to an alternative procedure the potassium methoxide (KOMe) solution (32% KOMe in methanol (MeOH)) were fed in and the stirred vessel was evacuated to a pressure of 10-20 mbar, heated to 65° C. and operated at 65° C. and a pressure of 10-20 mbar for 70 min. MeOH was distilled off.

The mixture was purged three times with $N_2$ (nitrogen). Thereafter, the vessel was checked for pressure retention, 0.5 bar gauge (1.5 bar absolute) was set and the mixture was heated to 120° C. The mixture was decompressed to 1 bar absolute and 1126 g (25.6 mol) of ethylene oxide (EO) were metered in until $p_{max}$ was 3.9 bar absolute and $T_{max}$ was 150° C. After 300 g of EO had been added, the metered addition was stopped (about 3 h after commencement) for a wait period of 30 min and the mixture was decompressed to 1.3 bar absolute. Thereafter, the rest of the EO was metered in. The metered addition of EO including the decompression took a total of 10 h.

Stirring was continued up to constant pressure at approx. 145-150° C. (1 h), and the mixture was cooled to 100° C. and freed of low boilers at a pressure of less than 10 mbar for 1 h. The material was transferred at 80° C. under $N_2$.

The analysis (OH number, GPC, 1H NMR in $CDCl_3$, 1H NMR in MeOD) confirmed the structure.

Example M2 HBVE-22 EO-10.6 PeQ (0.4 Mol % of Potassium Ions, 4.6 Mol % of Sodium Ions), Addition of the PeQ at 140° C. to 3.2 Bar A 2 l pressure autoclave with anchor stirrer was initially charged with 135.3 g (1.16 mol) of HBVE (stabilized with 100 ppm of KOH) and the stirrer was switched on. 1.06 g of KOMe solution (32% KOMe in MeOH, corresponding to 0.0048 mol of K) were fed in and the stirred vessel was evacuated to <10 mbar, heated to 80° C. and operated at 80° C. and <10 mbar for 70 min. MeOH was distilled off.

According to an alternative procedure the potassium methoxide (KOMe) solution (32% KOMe in methanol (MeOH)) were fed in and the stirred vessel was evacuated to a pressure of 10-20 mbar, heated to 65° C. and operated at 65° C. and a pressure of 10-20 mbar for 70 min. MeOH was distilled off.

The mixture was purged three times with $N_2$. Thereafter, the vessel was checked for pressure retention, 0.5 bar gauge (1.5 bar absolute) was set and the mixture was heated to 120° C. The mixture was decompressed to 1 bar absolute and 255 g (5.8 mol) of EO were metered in until $p_{max}$ was 3.9 bar absolute and $T_{max}$ was 150° C. Stirring was continued up to constant pressure at approx. 145-150° C. (1 h), and the mixture was cooled to 100° C. and freed of low boilers at a pressure of less than 10 mbar for 1 h. The material (HBVE-5 EO) was transferred at 80° C. under $N_2$.

A 2 l pressure autoclave with anchor stirrer was initially charged with 180 g (0.54 mol) of the above HBVE-5 EO and the stirrer was switched on. Thereafter, 4.32 g of 30% NaOMe (sodium methoxide) in MeOH solution (0.024 mol of NaOMe, 1.30 g of NaOMe) were added, a reduced pressure of <10 mbar was applied, and the mixture was heated to 100° C. and kept there for 80 min, in order to distill off the MeOH. The mixture was purged three times with $N_2$. Thereafter, the vessel was checked for pressure retention, 0.5 bar gauge (1.5 bar absolute) was set and the mixture was heated to 150° C. The mixture was decompressed to 1.0 bar absolute. 398 g (9.04 mol) of EO were metered in up to a pressure of 2 bar absolute and the reaction was allowed to continue for 1 h. The mixture was cooled to 140° C. and 502 g (5.83 mol) of PeO (pentylene oxide) were metered in at 1.2 bar absolute and 140° C. until the pressure rose to 3.2 bar absolute. The PeO was metered in within two hours. The mixture was cooled to 80° C., and residual oxide was drawn off until the pressure was below 10 mbar for at least 10 min. The vacuum was broken with $N_2$ and 100 ppm of BHT (butylhydroxytoluene) were added. The transfer was effected at 80° C. under $N_2$.

The analysis (mass spectrum, GPC, 1H NMR in $CDCl_3$, 1H NMR in MeOD) confirmed the structure.

Example M3 HBVE-22 EO-10.5 PeO (0.4 Mol % of Potassium Ions, 3.3 Mol % of Sodium Ions), Addition of the PeO at 140° C. to 2.1 Bar A 2 l pressure autoclave with anchor stirrer was initially charged with 135.3 g (1.16 mol) of hydroxybutyl vinyl ether (stabilized with 100 ppm of KOH) and the stirrer was switched on. 1.06 g of KOMe solution (32% KOMe in MeOH, corresponding to 0.0048 mol of K) were fed in and the stirred vessel was evacuated to <10 mbar, heated to 80° C. and operated at 800° C. and <10 mbar for 70 min. MeOH was distilled off.

According to an alternative procedure the potassium methoxide (KOMe) solution (32% KOMe in methanol (MeOH)) were fed in and the stirred vessel was evacuated to a pressure of 10-20 mbar, heated to 65° C. and operated at 65° C. and a pressure of 10-20 mbar for 70 min. MeOH was distilled off.

The mixture was purged three times with $N_2$. Thereafter, the vessel was checked for pressure retention, 0.5 bar gauge (1.5 bar absolute) was set and the mixture was heated to 120° C. The mixture was decompressed to 1 bar absolute and 255 g (5.8 mol) of EO were metered in until $p_{max}$ was 3.9 bar absolute and $T_{max}$ was 150° C. The mixture was freed of low boilers down to constant pressure as 10 mbar for 1 h. The material (HBVE-5 EO) was transferred at 80° C. under $N_2$.

A 2 l pressure autoclave with anchor stirrer was initially charged with 180 g (0.54 mol) of HBVE-5 EO and the stirrer was switched on. Thereafter, 3.18 g of 30% NaOMe in MeOH solution (0.018 mol of NaOMe, 0.95 g of NaOMe) were added, a reduced pressure of <10 mbar was applied, and the mixture was heated to 100° C. and kept there for 80 min, in order to distill off the MeOH. The mixture was purged three times with $N_2$. Thereafter, the vessel was checked for pressure retention, 0.5 bar gauge (1.5 bar absolute) was set and the mixture was heated to 150° C. The mixture was decompressed to 1.0 bar absolute. 398 g (9.04 mol) of EO were metered in up to a pressure of 2 bar absolute, reaction was allowed to continue for 1 h, then the mixture was cooled to 100° C. and freed of low boilers at a pressure of less than 10 mbar for 1 h. The material (HBVE-22 EO) was transferred at 80° C. under $N_2$.

A 1 l autoclave with anchor stirrer was initially charged with 450 g (0.425 mol) of the above HBVE-22 EO and the stirrer was switched on. The mixture was purged three times with $N_2$. Thereafter, the vessel was checked for pressure retention, 0.5 bar gauge (1.5 bar absolute) was set and the mixture was heated to 140° C. The mixture was decompressed to 1.0 bar absolute.

Then, at 1.4 bar absolute and 140° C., 384 g (5.83 mol) of PeO were metered in at 48 g/h until the pressure rose to 2.1 bar absolute. Two interruptions were necessary. The mixture was left to react at 140° C. until the pressure fell again. The PeO was metered in within two days. The mixture was cooled to 80° C. and residual oxide was drawn off until the pressure was below 10 mbar for at least 10 min. The vacuum was broken with $N_2$ and 100 ppm of BHT were added. The transfer was effected at 80° C. under $N_2$.

The analysis (mass spectrum, GPC, 1H NMR in $CDCl_3$, 1H NMR in MeOD) confirmed the structure.

Example M4 HBVE-22 EO-10 PeO (0.4 Mol % of Potassium Ions, 4.6 Mol % of Sodium Ions), Addition of the PeO at 127° C. to 2.1 Bar The starting material used was monomer M1 from example M1. A 2 l pressure autoclave with anchor stirrer was initially charged with 745 g (0.69 mol) of HBVE-22 EO and the stirrer was switched on. Thereafter, 5.36 g of 32% NaOMe in MeOH solution (0.0317 mol of NaOMe, 1.71 g of NaOMe) were added, a reduced pressure of <10 mbar was applied, and the mixture was heated to 80° C. and kept there for 80 min, in order to distill off the MeOH.

The mixture was purged three times with $N_2$. Thereafter, the vessel was checked for pressure retention, 0.5 bar gauge (1.5 bar absolute) was set, the mixture was heated to 127° C. and then the pressure was set to 1 bar absolute.

591 g (6.9 mol) of PeO were metered in at 127° C.; $p_{max}$ was 2.1 bar absolute. Two intermediate decompressions were necessary owing to increasing fill level. The PeO metering was stopped, and the mixture was left to react for 2 h until the pressure was constant and decompressed to 1.0 bar absolute. Thereafter, the metered addition of PeO was continued. $P_{max}$ was still 2.1 bar. After metered addition of PeO had ended, reaction was allowed to continue to constant pressure or for 4 h. The mixture was cooled to 110° C. and residual oxide was drawn off until the pressure was below mbar for at least 10 min. Then 0.5% water was added at 110° C. and volatiles were subsequently drawn off until the pressure was below 10 mbar for at least 10 min. The vacuum was broken with $N_2$ and 100 ppm of BHT were added. The transfer was effected at 800° C. under $N_2$.

The analysis (mass spectrum, GPC, 1H NMR in $CDCl_3$, 1H NMR in MeOD) confirmed the structure.

Example M5 HBVE-22 EO-11 PeO (0.4 Mol % of Potassium Ions, 4.6 Mol % of Sodium Ions), Addition of the PeO at 127° C. to 2.1 Bar The preparation was analogous to example M4, except that 11 rather than 10 eq (molar equivalents) of PeO were added.

Example M6 HBVE-24.5 EO-11 PeO (0.4 Mol % of Potassium Ions, 4.6 Mol % of Sodium Ions), Addition of the PeO at 127° C. to 2.1 Bar The starting material used was monomer M1 from example M1. A 2 l pressure autoclave with anchor stirrer was initially charged with 650 g (0.60 mol) of HBVE-22 EO and the stirrer was switched on. Thereafter, 5.96 g of 25% NaOMe in MeOH solution (0.0276 mol of NaOMe, 1.49 g of NaOMe) were added, a reduced pressure of <10 mbar was applied, and the mixture was heated to 100° C. and kept there for 80 min, in order to distill off the MeOH.

The mixture was purged three times with $N_2$. Thereafter, the vessel was checked for pressure retention, 0.5 bar gauge (1.5 bar absolute) was set, the mixture was heated to 120° C. and then the pressure was set to 1 bar absolute. 66 g (1.577 mol) of EO were metered in at 127° C.; $p_{max}$ was 2.1 bar absolute. After waiting for 30 min for establishment of constant pressure, the mixture was decompressed to 1.0 bar absolute. 567 g (6.6 mol) of PeO were metered in at 127° C.; $p_{max}$ was 2.1 bar absolute. Two intermediate decompressions were necessary owing to increasing fill level. The PeO metering was stopped, and the mixture was left to react for 2 h until the pressure was constant and decompressed to 1.0 bar absolute. Thereafter, the metered addition of PeO was continued. $P_{max}$ was still 2.1 bar. After metered addition of PeO had ended, reaction was allowed to continue to constant pressure or for 4 h. The mixture was cooled to 110° C. and residual oxide was drawn off until the pressure was below 10 mbar for at least 10 min. Then 0.5% water was added at 110° C. and volatiles were subsequently drawn off until the pressure was below 10 mbar for at least 10 min. The vacuum was broken with $N_2$ and 100 ppm of BHT were added. The transfer was effected at 80° C. under $N_2$.

The analysis (mass spectrum, GPC, 1H NMR in $CDCl_3$, 1H NMR in MeOD) confirmed the structure.

Example M7 HBVE-24.5 EO-10 PeO (0.4 Mol % of Potassium Ions, 4.6 Mol % of Sodium Ions), Addition of the PeO at 127° C. to 2.1 Bar Preparation was analogous to example M6, except that 10 rather than 11 eq of pentene oxide were added.

Example M8 HBVE-24.5 EO-10 PeO (0.9 Mol % of Potassium Ions, 4.1 Mol % of Sodium Ions), Addition of the PeO at 127° C. to 2.1 Bar The preparation was analogous to example M6, except that the catalyst concentration was 0.9 mol % of potassium ions and 4.1 mol % of sodium ions and 10 rather than 11 eq of PeO were added.

Example M9 HBVE-24.5 EO-10 PeO (1.5 Mol % of Potassium Ions, 4.6 Mol % of Sodium Ions), Addition of the PeO at 127° C. to 2.1 Bar The preparation was analogous to example M6, except that the catalyst concentration was 1.5 mol % of potassium ions and 4.1 mol % of sodium ions and 10 rather than 11 eq of PeO were added.

Example M10 HBVE-24.5 EO-10 PeO (0.4 Mol % of Potassium Ions, 5.5 Mol % of Sodium Ions), Addition of the PeO at 127° C. to 2.1 Bar The starting material used was monomer M1 from example M1. A 2 l pressure autoclave with anchor stirrer was initially charged with 684.0 g (0.631 mol) of HBVE-22 EO and the stirrer was switched on. Thereafter, 2.78 g of 50% NaOH (sodium hydroxide) solution (0.0348 mol of NaOH, 1.39 g of NaOH) were added, a reduced pressure of <10 mbar was applied, and the mixture was heated to 100° C. and kept there for 80 min, in order to distill off the water.

The mixture was purged three times with $N_2$. Thereafter, the vessel was checked for pressure retention, 0.5 bar gauge (1.5 bar absolute) was set, the mixture was heated to 120° C. and then the pressure was set to 1.6 bar absolute. 69.4 g (1.577 mol) of EO were metered in at 127° C.; $p_{max}$ was 2.1 bar absolute. After waiting for 30 min for establishment of constant pressure, the mixture was decompressed to 1.0 bar absolute.

542.5 g (6.03 mol) of PeO were metered in at 127° C.; $p_{max}$ was 2.1 bar absolute. One intermediate decompression was necessary owing to increasing fill level. The PeO metering was stopped, and the mixture was left to react for 1 h until the pressure was constant and decompressed to 1.0 bar absolute. Thereafter, the metered addition of PeO was continued. $P_{max}$ was still 2.1 bar (first decompression after 399 g of PeO, total PeO metering time 7 h incl. decompression break). After metered addition of PeO had ended, reaction was allowed to continue to constant pressure or for 3 h. The mixture was cooled to 110° C., and residual oxide was removed under reduced pressure until the pressure was below 10 mbar for at least 10 min. Then 0.5% water was added at 110° C. and volatiles were subsequently drawn off until the pressure was below 10 mbar for at least 10 min. The vacuum was broken with $N_2$ and 100 ppm of BHT were added. The transfer was effected at 80° C. under $N_2$.

The analysis (mass spectrum, GPC, 1H NMR in $CDCl_3$, 1H NMR in MeOD) confirmed the structure.

Example M11 HBVE-24.5 EO-9 PeO (0.4 Mol % of Potassium Ions, 5.5 Mol % of Sodium Ions), Addition of the PeO at 127° C. to 2.1 Bar The preparation was analogous to example M10, except that 9 rather than 10 eq of PeO were added.

Example M12 HBVE-24.5 EO-9 PeO (5.8 Mol % of Potassium Ions), Addition of the PeO at 127° C. to 2.1 Bar The starting material used was monomer M1 from example M1. A 2 l pressure autoclave with anchor stirrer was initially charged with 889.2 g (0.820 mol) of HBVE-22 EO and the stirrer was switched on. Thereafter, 9.69 g of 32% KOMe in MeOH solution (0.0443 mol of KOMe, 3.11 g KOMe) were added, a reduced pressure of <10 mbar was applied, and the mixture was heated to 80° C. and kept there for 80 min, in order to distill off MeOH.

The mixture was purged three times with $N_2$. Thereafter, the vessel was checked for pressure retention, 0.5 bar gauge (1.5 bar absolute) was set, the mixture was heated to 120° C. and then the pressure was set to 1 bar absolute. 90.2 g (2.050 mol) of EO were metered in up to 140° C. After waiting for 30 min for establishment of constant pressure, the mixture was decompressed to 1.0 bar absolute at 120° C.

A relatively large sample was taken, such that 789 g (0.66 mol) of HBVE-24.5 EO remained in the reactor. For safety, the mixture was inertized again with $N_2$, set to 1.0 bar absolute and heated to 127° C. 511 g (5.95 mol) of PeO were metered in at 127° C.; $p_{max}$ was 2.1 bar absolute. One intermediate decompression was necessary owing to increasing fill level. The PeO metering was stopped, and the mixture was left to react for 2 h until pressure was constant and decompressed to 1.0 bar absolute. Thereafter, the metered addition of PeO was continued. $P_{max}$ was still 2.1 bar. After metered addition of PeO had ended, reaction was allowed to continue to constant pressure or for 3 h. The mixture was cooled to 110° C., and residual oxide was removed under reduced pressure until the pressure was below 10 mbar for at least 10 min. Then 0.5% water was added at 110° C. and volatiles were subsequently drawn off until the pressure was below 10 mbar for at least 10 min. The vacuum was broken with $N_2$ and 100 ppm of BHT were added. The transfer was effected at 80° C. under $N_2$.

The analysis (mass spectrum, GPC, 1H NMR in $CDCl_3$, 1H NMR in MeOD) confirmed the structure.

Example M13 HBVE-24.5 EO-8 PeO (0.4 Mol % of Potassium Ions, 4.6 Mol % of Sodium Ions), Addition of the PeO at 127° C. to 2.1 Bar The preparation was analogous to example M6, except that 8 rather than 11 eq of PeO were added.

Example M14 HBVE-26.5 EO-10 PeO (0.4 Mol % of Potassium Ions, 5.5 Mol % of Sodium Ions), Addition of the PeO at 1270° C. to 2.1 Bar The preparation was analogous to example M10, except that, proceeding from HBVE-22 EO, 4.5 eq of EO rather than 2.5 eq of EO were added.

Example M15 HBVE-24.5 EO-10 PeO (0.4 Mol % of Potassium Ions, 5.5 Mol % of Sodium Ions), Addition of the PeO at 122° C. to 2.1 Bar The preparation was analogous to example M10, except that PeO was added at 122° C. rather than 127° C.

Example M16 HBVE-24.5 EO-10 PeO (0.4 Mol % of Potassium Ions, 5.5 Mol % of Sodium Ions), Addition of the PeO at 132° C. to 2.1 Bar The preparation was analogous to example M10, except that PeO was added at 132° C. rather than 127° C.

Example M17 HBVE-24.5 EO-10 BuO (0.4 Mol % of Potassium Ions, 5.5 Mol % of Sodium Ions), Addition of the BuO at 127° C. to 2.1 Bar The starting material used was monomer M1 from example M1. A 2 l pressure autoclave with anchor stirrer was initially charged with 730.8 g (0.674 mol) of HBVE-22 EO and the stirrer was switched on. Thereafter, 2.97 g of 50% NaOH solution (0.0371 mol of NaOH, 0.85 g of NaOH) were added, a reduced pressure of <10 mbar was applied, and the mixture was heated to 100° C. and kept there for 80 min, in order to distill off the water.

The mixture was purged three times with $N_2$. Thereafter, the vessel was checked for pressure retention, 0.5 bar gauge (1.5 bar absolute) was set, the mixture was heated to 120° C. and then the pressure was set to 1.6 bar absolute. 74.1 g (1.685 mol) of EQ were metered in up to 127° C.; $p_{max}$ was 3.9 bar absolute. After waiting for 30 min for establishment of constant pressure, the mixture was decompressed to 1.0 bar absolute.

485.3 g (6.74 mol) of BuO (butylene oxide) were metered in at 127° C.; $p_{max}$ was 2.1 bar absolute. One intermediate decompression was necessary owing to increasing fill level. The BuO metering was stopped, and the mixture was left to react for 1 h until pressure was constant and decompressed to 1.0 bar absolute. Thereafter, the metered addition of BuQ was continued. $P_{max}$ was still 2.1 bar (first decompression after 246 g of BuO, total BuO metering time 10 h incl. decompression break). After metered addition of BuO had ended, reaction was allowed to continue to constant pressure or for 3 h. The mixture was cooled to 110° C., and residual oxide was drawn off until the pressure was below 10 mbar for at least 10 min. Then 0.5% water was added at 110° C. and volatiles were subsequently drawn off until the pressure was below 10 mbar for at least 10 min. The vacuum was broken with $N_2$ and 100 ppm of BHT were added. The transfer was effected at 80° C. under $N_2$.

The analysis (mass spectrum, GPC, 1H NMR in $CDCl_3$, 1H NMR in MeOD) confirmed the structure, Example M18 HBVE-24.5 EO-12 BuO (0.4 Mol % of Potassium Ions, 5.5 Mol % of Sodium Ions), Addition of the BuO at 127° C. to 2.1 Bar The preparation was analogous to example M17, except that 12 rather than 10 eq of BuO were added.

Example M19 HBVE-24.5 EO-14 BuO (0.4 Mol % of Potassium Ions, 5.5 Mol % of Sodium Ions), Addition of the BuO at 127° C. to 2.1 Bar The preparation was analogous to example M17, except that 14 rather than 10 eq of BuO were added.

Example M20 HBVE-24.5 EO-16 BuO (0.4 Mol % of Potassium Ions, 5.5 Mol % of Sodium Ions), Addition of the BuO at 127° C. to 2.1 Bar The preparation was analogous to example M17, except that 16 rather than 10 eq of BuO were added.

Example M21 HBVE-24.5 EO-18 BuO (0.4 Mol % of Potassium Ions, 5.5 Mol % of Sodium Ions), Addition of the BuO at 127° C. to 2.1 Bar The preparation was analogous to example M17, except that 18 rather than 10 eq of BuO were added.

Example M22 HBVE-24.5 EO-16 BuO (5.8 Mol % of Potassium Ions), Addition of the BuO at 127° C. to 3.1 Bar The starting material used was monomer M1 from example M1. A 2 l pressure autoclave with anchor stirrer was initially charged with 622.8 g (0.575 mol) of HBVE-22 EO and the stirrer was switched on. Thereafter, 6.92 g of 32% KOMe in MeOH solution (0.0316 mol of KOMe, 2.21 g of KOMe) were added, a reduced pressure of <10 mbar was applied, and the mixture was heated to 80° C. and kept there for 80 min, in order to distill off the methanol.

The mixture was purged three times with $N_2$. Thereafter, the vessel was checked for pressure retention, 0.5 bar gauge (1.5 bar absolute) was set, the mixture was heated to 120° C. and then the pressure was set to 1.6 bar absolute. 50.3 g (1.144 mol) of EO were metered in up to 127° C.; $P_{max}$ was 3.9 bar absolute. After waiting for 30 min for establishment of constant pressure, the mixture was decompressed to 1.0 bar absolute.

662 g (9.19 mol) of BuO were metered in at 127° C.; $p_{max}$ was 3.1 bar absolute. After metered addition of BuO had ended, reaction was allowed to continue to constant pressure or for 5 h. The mixture was cooled to 110° C., and residual oxide was drawn off until the pressure was below 10 mbar for at least 10 min. Then 0.5% water was added at 110° C. and volatiles were subsequently drawn off until the pressure was below 10 mbar for at least 10 min. The vacuum was broken with $N_2$ and 100 ppm of BHT were added. The transfer was effected at 80° C. under $N_2$.

The analysis (mass spectrum, GPC, 1H NMR in $CDCl_3$, 1H NMR in MeOD) confirmed the structure.

Example M23 HBVE-24.5 EO-16 BuO (0.4 Mol % of Potassium Ions, 11 Mol % of Sodium Ions), Addition of the BuO at 127° C. to 3.1 Bar The starting material used was monomer M1 from example M1. A 2 l pressure autoclave with anchor stirrer was initially charged with 595.1 g (0.549 mol) of HBVE-22 EO and the stirrer was switched on. Thereafter, 4.83 g of 50% NaOH solution (0.060 mol of NaOH, 2.41 g of NaOH) were added, a reduced pressure of <10 mbar was applied, and the mixture was heated to 100° C. and kept there for 80 min, in order to distill off the water.

The mixture was purged three times with $N_2$. Thereafter, the vessel was checked for pressure retention, 0.5 bar gauge (1.5 bar absolute) was set, the mixture was heated to 120° C. and then the pressure was set to 1.6 bar absolute. 60.4 g (1.373 mol) of EO were metered in up to 127° C.; $p_{max}$ was 3.9 bar absolute. After waiting for 30 min for establishment of constant pressure, the mixture was decompressed to 1.0 bar absolute.

632.2 g (8.748 mol) of BuO were metered in at 127° C.; $p_{max}$ was 3.1 bar absolute. One intermediate decompression was necessary owing to increasing fill level. The BuO metering was stopped, and the mixture was left to react for 1 h until pressure was constant and decompressed to 1.0 bar absolute. Thereafter, the metered addition of BuO was continued. $P_{max}$ was still 3.1 bar (first decompression after 334 g of BuO, total BuO metering time 5 h incl. decompression break). After metered addition of BuO had ended, the mixture was heated to 135° C. and reaction was allowed to continue for 3.5 h. The mixture was cooled to 100° C., and residual oxide was drawn off until the pressure was below 10 mbar for at least 10 min. Then 0.5% water was added at 120° C. and volatiles were subsequently drawn off until the pressure was below 10 mbar for at least 10 min. The vacuum was broken with $N_2$ and 100 ppm of BHT were added. The transfer was effected at 80° C. under $N_2$.

The analysis (mass spectrum, GPC, 1H NMR in $CDCl_3$, 1H NMR in MeOD) confirmed the structure.

Example M24 HBVE-23 EO-17 BuO-2.5 EO (0.4 Mol % of Potassium Ions, 5.5 Mol % of Sodium Ions), Addition of the BuO at 127° C. to 3.1 Bar The starting material used was monomer M1 from example M1. A 2 l pressure autoclave with anchor stirrer was initially charged with 576.7 g (0.532 mol) of HBVE-22 EO and the stirrer was switched on. Thereafter, 2.33 g of 50% NaOH solution (0.029 mol of NaOH, 1.17 g of NaOH)

were added, a reduced pressure of <10 mbar was applied, and the mixture was heated to 100° C. and kept there for 80 min, in order to distill off the water.

The mixture was purged three times with $N_2$. Thereafter, the vessel was checked for pressure retention, 0.5 bar gauge (1.5 bar absolute) was set, the mixture was heated to 127° C. and then the pressure was set to 1.6 bar absolute. 23.4 g (0.532 mol) of EO were metered in at 127° C.; $p_{max}$ was 3.9 bar absolute. After waiting for 30 min for establishment of constant pressure, the mixture was decompressed to 1.0 bar absolute.

651.2 g (9.044 mol) of BuO were metered in at 127° C.; $p_{max}$ was 3.1 bar absolute. After metered addition of BuO had ended, the mixture was heated to 135° C. and reaction was allowed to continue for 2 h. Thereafter 58.5 g (1.331 mol) of EO were metered at 135° C.; $p_{max}$ was 3.2 bar absolute. After metered addition of EO had ended, the reaction was allowed to continue for 2 h.

The mixture was cooled to 100° C., and residual oxide was drawn off until the pressure was below mbar for at least 10 min. Then 0.5% water was added at 120° C. and volatiles were subsequently drawn off until the pressure was below 10 mbar for at least 10 min. The vacuum was broken with $N_2$ and 100 ppm of BHT were added. The transfer was effected at 80° C. under $N_2$.

The analysis (mass spectrum, GPC, 1H NMR in $CDCl_3$, 1H NMR in MeOD) confirmed the structure.

Example M25 HBVE-24.5 EQ-16 BuO-3.5 EO (0.4 Mol % of Potassium Ions, 5.5 Mol % of Sodium Ions), Addition of the BuO at 127° C. to 3.1 Bar The starting material used was monomer M1 from example M1. A 2 l pressure autoclave with anchor stirrer was initially charged with 588.6 g (0.543 mol) of HBVE-22 EO and the stirrer was switched on. Thereafter, 2.39 g of 50% NaOH solution (0.030 mol of NaOH, 1.19 g of NaOH) were added, a reduced pressure of <10 mbar was applied, and the mixture was heated to 100° C. and kept there for 80 min, in order to distill off the water.

The mixture was purged three times with $N_2$. Thereafter, the vessel was checked for pressure retention, 0.5 bar gauge (1.5 bar absolute) was set, the mixture was heated to 127° C. and then the pressure was set to 1.6 bar absolute. 59.7 g (1.358 mol) of EQ were metered in at 127° C.; $p_{max}$ was 3.9 bar absolute. After waiting for 30 min for establishment of constant pressure, the mixture was decompressed to 1.0 bar absolute.

625.5 g (8.688 mol) of BuO were metered in at 127° C.; $p_{max}$ was 3.1 bar absolute. One intermediate decompression was necessary owing to increasing fill level. The BuO metering was stopped, and the mixture was left to react for 1 h until pressure was constant and decompressed to 1.0 bar absolute. Thereafter, the metered addition of BuO was continued. $P_{max}$ was still 3.1 bar (first decompression after 610 g of BuO, total BuO metering time 8 h incl. decompression break). After metered addition of BuO had ended, the reaction was allowed to continue for 8 h and thereafter the mixture was heated to 135° C. Thereafter 83.6 g (1.901 mol) of EO were metered at 135° C.; $p_{max}$ was 3.1 bar absolute. After metered addition of EO had ended, the reaction was allowed to continue for 4 h. The mixture was cooled to 100° C., and residual oxide was drawn off until the pressure was below 10 mbar for at least 10 min. Then 0.5% water was added at 120° C. and volatiles were subsequently drawn off until the pressure was below 10 mbar for at least 10 min. The vacuum was broken with $N_2$ and 100 ppm of BHT were added. The transfer was effected at 80° C. under $N_2$.

The analysis (mass spectrum, GPC, 1H NMR in $CDCl_3$, 1H NMR in MeOD) confirmed the structure.

Example M26 HBVE-24.5 EO-16 BuO-5 EO (0.4 Mol % of Potassium Ions, 5.5 Mol % of Sodium Ions), Addition of the BuO at 127° C. to 3.1 Bar The starting material used was monomer M1 from example M1. The preparation was analogous to example M25, except that 5 rather than 3.5 eq of EO were added after addition of BuO and polymerisation, i.e. 119.5 g (2.715 mol) of EO were metered at 135° C.

The analysis (mass spectrum, GPC, 1H NMR in CDCl3, 1H NMR in MeOD) confirmed the structure.

Example M27 HBVE-24.5 EO-10 BuO-3.5 EO (0.4 Mol % of Potassium Ions, 5.5 Mol % of Sodium Ions), Addition of the BuO at 127° C. to 3.1 Bar The starting material used was monomer M1 from example M1. A 2 l pressure autoclave with anchor stirrer was initially charged with 685.2 g (0.632 mol) of HBVE-22 EO and the stirrer was switched on. Thereafter, 2.78 g of 50% NaOH solution (0.035 mol of NaOH, 1.39 g of NaOH) were added, a reduced pressure of <10 mbar was applied, and the mixture was heated to 100° C. and kept there for 80 min, in order to distill off the water.

The mixture was purged three times with $N_2$. Thereafter, the vessel was checked for pressure retention, 0.5 bar gauge (1.5 bar absolute) was set, the mixture was heated to 127° C. and then the pressure was set to 1.6 bar absolute. 69.8 g (1.587 mol) of EQ were metered in at 127° C.; $p_{max}$ was 3.9 bar absolute. After waiting for 30 min for establishment of constant pressure, the mixture was decompressed to 1.0 bar absolute.

455.2 g (6.322 mol) of BuO were metered in at 127° C.; $p_{max}$ was 3.1 bar absolute. After metered addition of BuO had ended, the reaction was allowed to continue for 7 h. Thereafter 97.4 g (2.213 mol) of EO were metered at 127° C.; $p_{max}$ was 3.1 bar absolute. After metered addition of EO had ended, the reaction was allowed to continue for 2 h. The mixture was cooled to 100° C., and residual oxide was drawn off until the pressure was below 10 mbar for at least 10 min. Then 0.5% water was added at 120° C. and volatiles were subsequently drawn off until the pressure was below 10 mbar for at least 10 min. The vacuum was broken with $N_2$ and 100 ppm of BHT were added. The transfer was effected at 80° C. under $N_2$.

The analysis (mass spectrum, GPC, 1H NMR in $CDCl_3$, 1H NMR in MeOD) confirmed the structure.

Example M28 HBVE-24.5 EO-5 BuO-3.5 EO (0.4 Mol % of Potassium Ions, 5.5 Mol % of Sodium Ions), Addition of the BuO at 127° C. to 3.1 Bar The starting material used was monomer M1 from example M1. A 2 l pressure autoclave with anchor stirrer was initially charged with 822.0 g (0.758 mol) of HBVE-22 EO and the stirrer was switched on. Thereafter, 3.34 g of 50% NaOH solution (0.042 mol of NaOH, 1.67 g of NaOH) were added, a reduced pressure of <10 mbar was applied, and the mixture was heated to 100° C. and kept there for 80 min, in order to distill off the water.

The mixture was purged three times with $N_2$. Thereafter, the vessel was checked for pressure retention, 0.5 bar gauge (1.5 bar absolute) was set, the mixture was heated to 127° C. and then the pressure was set to 1.6 bar absolute. 83.4 g (1.895 mol) of EO were metered in at 127° C.; $p_{max}$ was 3.9 bar absolute. After waiting for 30 min for establishment of constant pressure, the mixture was decompressed to 1.0 bar absolute.

273.0 g (3.792 mol) of BuO were metered in at 127° C.; $p_{max}$ was 3.1 bar absolute. After metered addition of BuO had ended, the reaction was allowed to continue for 15 h. Thereafter 116.8 g (2.654 mol) of EO were metered at 127° C.; $P_{max}$ was 3.1 bar absolute. After metered addition of EO had ended, the reaction was allowed to continue for 4 h. The mixture was cooled to 100° C., and residual oxide was drawn off until the pressure was below 10 mbar for at least 10 min. Then 0.5% water was added at 120° C. and volatiles were subsequently drawn off until the pressure was below 10 mbar for at least 10 min. The vacuum was broken with $N_2$ and 100 ppm of BHT were added. The transfer was effected at 80° C. under $N_2$.

The analysis (mass spectrum, GPC, 1H NMR in $CDCl_3$, 1H NMR in MeOD) confirmed the structure.

Example M29 HBVE-24.5 EO-22 BuO-3.5 EO (0.4 Mol % of Potassium Ions, 5.5 Mol % of Sodium Ions), Addition of the BuO at 127° C. to 3.1 Bar The starting material used was monomer M1 from example M1. A 2 l pressure autoclave with anchor stirrer was initially charged with 493.3 g (0.455 mol) of HBVE-22 EO and the stirrer was switched on. Thereafter, 2.00 g of 50% NaOH solution (0.025 mol of NaOH, 1.00 g of NaOH) were added, a reduced pressure of <10 mbar was applied, and the mixture was heated to 100° C. and kept there for 80 min, in order to distill off the water.

The mixture was purged three times with $N_2$. Thereafter, the vessel was checked for pressure retention, 0.5 bar gauge (1.5 bar absolute) was set, the mixture was heated to 127° C. and then the pressure was set to 1.6 bar absolute. 50.0 g (1.138 mol) of EO were metered in at 127° C.; $p_{max}$ was 3.9 bar absolute. After waiting for 30 min for establishment of constant pressure, the mixture was decompressed to 1.0 bar absolute.

720.9 g (10.012 mol) of BuO were metered in at 127° C.; $p_{max}$ was 3.1 bar absolute. After metered addition of BuO had ended, the reaction was allowed to continue for 9 h. The mixture was heated to 135° C. Thereafter 70.1 g (1.593 mol) of EO were metered at 135° C.; $p_{max}$ was 3.1 bar absolute. After metered addition of EO had ended, the reaction was allowed to continue for 2 h. The mixture was cooled to 100° C., and residual oxide was drawn off until the pressure was below 10 mbar for at least 10 min. Then 0.5% water was added at 120° C. and volatiles were subsequently drawn off until the pressure was below 10 mbar for at least 10 min. The vacuum was broken with $N_2$ and 100 ppm of BHT were added. The transfer was effected at 80° C. under $N_2$.

The analysis (mass spectrum, GPC, 1H NMR in $CDCl_3$, 1H NMR in MeOD) confirmed the structure.

Example M30 HBVE-24.5 EO-16 BuO-3.5 EO (0.4 Mol % of Potassium Ions, 5.5 Mol % of Sodium Ions), Addition of the BuO at 127° C. at from 4 to 6 Bar The starting material used was monomer M1 from example M1. A 2 l pressure autoclave with anchor stirrer was initially charged with 568.6 g (0.525 mol) of HBVE-22 EO and the stirrer was switched on. Thereafter, 2.31 g of 50% NaOH solution (0.029 mol of NaOH, 1.16 g of NaOH) were added, a reduced pressure of <10 mbar was applied, and the mixture was heated to 100° C. and kept there for 80 min, in order to distill off the water.

The mixture was purged three times with $N_2$. Thereafter, the vessel was checked for pressure retention, 0.5 bar gauge (1.5 bar absolute) was set, the mixture was heated to 127° C. and then the pressure was set to 3 bar absolute. 57.7 g (1.311 mol) of EO were metered in at 127° C.; $p_{max}$ was 6 bar absolute. After waiting for 30 min for establishment of constant pressure, the mixture was decompressed to 4.0 bar absolute.

604.2 g (8.392 mol) of BuO were metered in at 127° C.; $p_{max}$ was 6 bar absolute. One intermediate decompression was necessary owing to increasing fill level. The BuO metering was stopped, and the mixture was left to react for 1 h until pressure was constant and decompressed to 4.0 bar absolute. Thereafter, the metered addition of BuO was continued. $P_{max}$ was still 6 bar (first decompression after 505 g of BuO, total BuO metering time 11 h incl. decompression break). After metered addition of BuO had ended, the reaction was allowed to continue for 6 h at 127° C. It was decompressed to 4 bar absolute.

Thereafter 80.8 g (1.836 mol) of EO were metered at 127° C.; $p_{max}$ was 6 bar absolute. After metered addition of EO had ended, the reaction was allowed to continue for 4 h. The mixture was cooled to 100° C., and residual oxide was drawn off until the pressure was below 10 mbar for at least 10 min. About 1400 ppm of volatile components were removed. Then 0.5% water was added at 120° C. and volatiles were subsequently drawn off until the pressure was below 10 mbar for at least 10 min. The vacuum was broken with $N_2$ and 100 ppm of BHT were added. The transfer was effected at 80° C. under $N_2$.

The analysis (mass spectrum, GPC, 1H NMR in $CDCl_3$, 1H NMR in MeOD) confirmed the structure.

I-b Preparation of the Copolymers Based on Monomers (M2-M30)

Example C1 General Preparation of a Copolymer from 2% by Weight of Monomer M, 50% by Weight of Acrylamide and 48% by Weight of 2-Acrylamido-2-Methylpropanesulfonic Acid A plastic bucket with a magnetic stirrer, pH meter and thermometer was initially charged with 121.2 g of a 50% aqueous solution of NaATBS (2-acrylamido-2-methylpropanesulfonic acid, Na salt), followed by successive addition of 155 g of distilled water, 0.6 g of a defoamer (Surfynol® DF-58), 0.2 g of a silicone defoamer (Baysilon® EN), 2.3 g of monomer M, 114.4 g of a 50% aqueous solution of acrylamide, 1.2 g of pentasodium diethylenetriaminepentaacetate (complexing agent, as a 5% aqueous solution) and 2.4 g of a nonionic surfactant (isotridecanol, alkoxylated with 15 units of ethylene oxide).

After adjusting the pH with a 20% or 2% sulfuric acid solution to a value of 6 and adding the rest of the water, the monomer solution was adjusted to the start temperature of 5° C. The total amount of the water was such that—after the polymerization—a solids concentration of approx. 30 to 36% by weight was attained. The solution was transferred into a thermos flask, a temperature sensor was provided for temperature recording and the solution was purged with $N_2$ for 30 minutes. The polymerization was subsequently initiated by addition of 1.6 ml of a 10% aqueous solution of a water-soluble cationic azo initiator 2,2'-azobis(2-amidinopropane)dihydrochloride (Wako V-50), 0.12 ml of a 1% aqueous solution of tert-butyl hydroperoxide and 0.24 ml of a 1% sodium sulfite solution. After the initiators had been added, the temperature rose to approx. 80° C. within 15 to 30 min. After 30 min, the reaction vessel was placed in a drying cabinet at approx. 80° C. for approx. 2 h to complete the polymerization. The total polymerization time was about 2 h to 2.5 h.

A gel block was obtained, which, after the polymerization had ended, was comminuted with a meat grinder. The gel granules thus obtained were dried in a fluidized bed drier at 55° C. for two hours. Hard white granules were obtained, which were converted to a pulverulent state by means of a centrifugal mill. A copolymer was obtained with a weight-average molecular weight of about 1 000 000 g/mol to 30 000 000 g/mol.

Example C2 Copolymer Based on Monomer M2

The copolymer was obtained according to the above general preparation method by using monomer 2 from comparative example M2.

Examples C3 to C30

Copolymers C3 to C30 were prepared by the above general method by using the respective monomers M3 to M30.

PART II: PERFORMANCE TESTS

The resulting copolymers based on the above monomers were used to conduct the tests which follow, in order to assess the suitability thereof for tertiary mineral oil production.

Description of the Test Methods a) Determination of Solubility

The copolymers were dissolved in synthetic seawater to DIN 50900 (salt content 35 g/l) so as to give a polymer concentration of 2000 ppm: 0.5 g of the respective copolymer was stirred in 249 g of synthetic seawater (DIN 50900) for 24 h until complete dissolution (the precision glass stirrer used should preferably be a paddle stirrer; the polymer was scattered gradually into the vortex which forms).

b) Determination of Viscosity

The viscosities of the abovementioned copolymer solutions were determined using a Haake rheometer with double gap geometry at 7 Hz and 60° C. After approx. 5 min, a plateau value was established for the viscosity, which was read off. Very good values were considered to be viscosities greater than or equal to 150 mPas (2000 ppm of copolymer in synthetic seawater at 600° C. and 7 Hz). Good values were considered to be viscosities greater of 120 mPas to 149 mPas. Moderate viscosity values were considered to be from 80 to 119 mPas. Viscosities of less than 80 mPas were considered to be poor.

c) Determination of Filterability

Prior to the actual filtration test, the polymer solution was filtered through a 200 μm Retsch sieve to determine the gel content thereof.

The filtration test to determine the MPFR value—the ratio of the flow rate of the first quarter to that of the fourth quarter is called the "Millipore filter ratio" (MPFR)—was conducted by means of a Sartorius 16249 pressure filtration cell (filter diameter 47 mm) and an Isopore polycarbonate membrane filter (diameter 47 mm, pore size 3 μm) at room temperature and 1 bar gauge. 210-220 g of polymer solution were used. In the test, at least 180 g of filtrate were to pass through within 30 minutes. Good values were considered to be MPFR of less than or equal to 1.3. If they are between 1.3 and 1.6, filterability was considered to be moderate. If less than 30 g of filtrate passed through, the sample was considered to be unfilterable.

d) Determination of the Gel Content 1 g of the respective copolymer from preparation examples 2-30 was stirred in 249 g of synthetic seawater to DIN 50900 (salt content 35 g/l) until complete dissolution for 24 h. Subsequently, the solution was filtered through a sieve of mesh size 200 μm and the volume of the residue remaining on the sieve was measured. The value obtained corresponds to the gel content.

Test Results:

| Example | Copolymer | Soluble? | Viscosity | Filterability | Gel content |
|---|---|---|---|---|---|
| 2 | C2 based on M2 HBVE-22 EO-10.6 PeO (0.4 mol % of potassium ions, 4.6 mol % of sodium ions), addition of the PeO at 140° C. to 3.2 bar | yes | good | good | 0 ml |
| 3 | C3 based on M3 HBVE-22 EO-10.5 PeO (0.4 mol % of potassium ions, 3.3 mol % of sodium ions), addition of the PeO at 140° C. to 2.1 bar | yes | good | unfilterable | 2 ml |
| 4 | C4 based on M4 HBVE-22 EO-10 PeO (0.4 mol % of potassium ions, 4.6 mol % of sodium ions), addition of the PeO at 127° C. to 2.1 bar | yes | good | good | 0 ml |
| 5 | C5 based on M5 HBVE-22 EO-11 PeO (0.4 mol % of potassium ions, 4.6 mol % of sodium ions), addition of the PeO at 127° C. to 2.1 bar | yes | good | unfilterable | 12 ml |
| 6 | C6 based on M6 HBVE-24.5 EO-11 PeO (0.4 mol % of potassium ions, 4.6 mol % of sodium ions), addition of the PeO at 127° C. to 2.1 bar | yes | good | good | 0 ml |

-continued

| Example | Copolymer | Soluble? | Viscosity | Filterability | Gel content |
|---|---|---|---|---|---|
| 7 | C7 based on M7 HBVE-24.5 EO-10 PeO (0.4 mol % of potassium ions, 4.6 mol % of sodium ions), addition of the PeO at 127° C. to 2.1 bar | yes | good | good | 0 ml |
| 8 | C8 based on M8 HBVE-24.5 EO-10 PeO (0.9 mol % of potassium ions, 4.1 mol % of sodium ions), addition of the PEO at 127° C. to 2.1 bar | yes | good | moderate | 0-1 ml |
| 9 | C9 based on M9 HBVE-24.5 EO-10 PeO (1.5 mol % of potassium ions, 4.6 mol % of sodium ions), addition of the PeO at 127° C. to 2.1 bar | yes | good | unfilterable | 3 ml |
| 10 | C10 based on M10 HBVE-24.5 EO-10 PeO (0.4 mol % of potassium ions, 5.5 mol % of sodium ions), addition of the PeO at 127° C. to 2.1 bar | yes | good | good | 0 ml |
| 11 | C11 based on M11 HBVE-24.5 EO-PeO (0.4 mol % of potassium ions, 5.5 mol % of sodium ions), addition of the PeO at 127° C. to 2.1 bar | yes | good | good | 0 ml |
| 12 | C12 based on M12 HBVE-24.5 EO-PeO (5.8 mol % of potassium ions), addition of the PeO at 127° C. to 2.1 bar | yes | good | unfilterable | 48 ml |
| 13 | C13 based on M13 HBVE-24.5 EO-8 PeO (0.4 mol % of potassium ions, 4.6 mol % of sodium ions), addition of the PeO at 127° C. to 2.1 bar | yes | good | moderate | 0-1 ml |
| 14 | C14 based on M14 HBVE-26.5 EQ-10 PeO (0.4 mol % of potassium ions, 5.5 mol % of sodium ions), addition of the PeO at 127° C. to 2.1 bar | yes | good | moderate | 0-1 ml |
| 15 | C15 based on M15 HBVE-24.5 EO-10 PeO (0.4 mol % of potassium ions, 5.5 mol % of sodium ions), addition of the PeO at 122° C. to 2.1 bar | yes | good | good | 0 ml |
| 16 | C16 based on M16 HBVE-24.5 EO-10 PeO (0.4 mol % of potassium ions, 5.5 mol % of sodium ions), addition of the PEO at 132° C. to 2.1 bar | yes | good | good | 0 ml |
| 17 | C17 based on M17 HBVE-24.5 EO-10 BuO (0.4 mol % of potassium ions, 5.5 mol % of sodium ions), addition of the BuO at 127° C. to 2.1 bar | yes | poor | good | 0 ml |
| 18 | C18 based on M18 HBVE-24.5 EO-12 BuO (0.4 mol % of potassium ions, 5.5 mol % of sodium ions), addition of the BuO at 127° C. to 2.1 bar | yes | poor | good | 0 ml |
| 19 | C19 based on M19 HBVE-24.5 EO-14 BuO (0.4 mol % of potassium ions, 5.5 mol % of sodium ions), addition of the BuO at 127° C. to 2.1 bar | yes | good | good | 0 ml |
| 20 | C20 based on M20 HBVE-24.5 EO-16 BuO (0.4 mol % of potassium ions, 5.5 mol % of sodium ions), addition of the BuO at 127° C. to 2.1 bar | yes | good | good | 0 ml |
| 21 | C21 based on M21 HBVE-24.5 EO-18 BuO (0.4 mol % of potassium ions, 5.5 mol % of sodium ions), addition of the BuO at 127° C. to 2.1 bar | yes | good | unfilterable | 2 ml |

-continued

| Example | Copolymer | Soluble? | Viscosity | Filterability | Gel content |
|---|---|---|---|---|---|
| 22 | C22 based on M22 HBVE-24.5 EO-16 BuO (5.8 mol % of potassium ions), addition of the BuO at 127° C. to 3.1 bar | yes | good | unfilterable | 5-10 ml |
| 23 | C23 based on M23 HBVE-24.5 EO-16 BuO (0.4 mol % potassium ions, 11 mol % sodium ions), addition of the BuO at 127° C. to 3.1 bar | yes | good | good | 0 ml |
| 24 | C24 based on M24 HBVE-23 EO,-17 BuO-2.5 EO (0.4 mol % potassium ions , 5.5 mol % sodium ions), addition of the BuO at 127° C. to 3.1 bar | yes | very good | good | 0 ml |
| 25 | C25 based on M25 HBVE-24.5 EO-16 BuO-3.5 EO (0.4 mol % potassium ions, 5.5 mol % sodium ions), addition of the BuO at 127° C. to 3.1 bar | yes | very good | good | 0 ml |
| 26 | C26 based on M26 HBVE-24.5 EO-16 BuO-5 EO (0.4 mol % potassium ions, 5.5 mol % sodium ions), addition of the BuO at 127° C. to 3.1 bar | yes | very good | good | 0 ml |
| 27 | C27 based on M27 HBVE-24.5 EO-10 BuO-3.5 EO (0.4 mol % potassium ions, 5.5 mol % sodium ions), addition of the BuO at 127° C. to 3.1 bar | yes | moderate | good | 0 ml |
| 28 | C28 based on M28 HBVE-24.5 EO-5 BuO-3.5 EO (0.4 mol % potassium ions, 5.5 mol % sodium ions), addition of the BuO at 127° C. to 3.1 bar | yes | moderate | good | 0 ml |
| 29 | C29 based on M29 HBVE-24.5 EO-22 BuO-3.5 EO (0.4 mol % potassium ions, 5.5 mol % sodium ions), addition of the BuO at 127° C. to 3.1 bar | yes | very good | very good | 0 ml |
| 30 | C30 based on M30 HBVE-24.5 EO-16 BuO-3.5 EO (0.4 mol % potassium ions, 5.5 mol % sodium ions), addition of the BuO at 127° C. at 4 to 6 bar | yes | very good | good | 0 ml |

Examples 2 and 3 show that the pressure window for the PeO metering at 140° C. has a great influence on the product quality. A larger pressure window enables rapid metering and a short cycle time (2 h for PeO). If, however, the pressure window required by the safety specifications is observed, as in example 3, the reaction is prolonged (2 days for PeO). As a result of the high temperature, there are side reactions and formation of crosslinkers, the effect of which is that the later copolymerization forms a thickening copolymer which is no longer filterable, and this is no longer employable for uses in a porous matrix (for example mineral oil-bearing rock strata, thickeners in mineral oil production). Example 4 shows that lowering the reaction temperature while maintaining the small pressure window can produce copolymers free of crosslinkers. As can be seen in the examples, the concentration of potassium ions is of central significance. As examples 9 and 12 show, above 0.9 mol % of potassium ions, the polymer is no longer filterable in spite of temperatures of 127° C. in the PeO metering. A potassium ion concentration greater than 0.9 mol % apparently leads to the formation of crosslinking compounds which lead to a copolymer which is no longer filterable. In addition, the exact content of sodium ion catalyst appears also to play an important role.

Surprisingly, it is additionally observed that the hydrophilic/hydrophobic ratio of the monomer is also of great significance. In spite of crosslinker-free operation, the copolymer according to example 5 has somewhat poorer filterability than copolymers based on monomers with only 1 eq of PeO less (example 4). If monomers with 24.5 units of EO are used, the variation in the PeO units has no influence on the filterability of the copolymers (comparison of examples 6 and 7 and comparison of examples 10 and 11). The specific selection of a hydrophilic/hydrophobic ratio, i.e. ratio of EO and PeO units, led to surprising robustness of the process. In examples 10 and 11 (24.5 EO units), no variation in the PeO content was perceptible. This gives good stability for industrial scale production, where variations of less than 1 eq of alkylene oxide are not easy to guarantee. Deviations in process and structure are thus much better tolerated in the later copolymer synthesis or application.

A similar picture is found in the case of copolymers based on monomers with terminal BuO groups. A comparison of examples 20 and 22 shows that, in the case of preparation of copolymers based on monomers with terminal BuO groups too, a concentration of potassium ions of less than 0.9 mol % surprisingly leads to improved copolymers. Excessively high values for potassium ions in the copolymer lead to unfilterable structures.

Examples 19 and 20 show that optimal product properties (good viscosities and good filterability) can be achieved especially at a butoxylation level above 12 and below 18. A comparison of the results relating to monomers with terminal PeO groups and relating to monomers with terminal BuO groups has additionally shown that the total number of carbon atoms in the side chains of the monomers, especially in the terminal alkylene oxide blocks, is of crucial significance for the property of the resulting copolymers. For example, the total number of carbon atoms in the side chains of the terminal alkylene oxide block from examples 19 and 20 (total of 28 to 32 carbon atoms in side chains) coincides with the total number range in examples 6, 10 and 11 (total of 27 to 33 carbon atoms in side chains) relating to monomers with terminal PeO groups. Other butoxylation levels as in examples 17, 18 and 21 lead to properties of the monomer which are no longer optimal in all ranges.

Further, it has been shown that monomers with BuO blocks, in particular with blocks having 16 to 22 BuO units, can advantageously be modified with an terminal EO block. Thus, copolymers with very good viscosity properties and good filterability can be obtained (examples 24 to 26 and 29). Contrary, it seems that the introduction of an terminal EO block in monomers having an BuO block with less than 12 BuO units do not result in an advantageous effect (examples 27 and 28).

Example 23 shows that the concentration of sodium ions can be up to at least 11 mol % during the addition of butylene oxide.

Example 30 shows that the addition of butylene oxide can also advantageously be carried out at a pressure in the range of 4 to 6 bar.

The invention claimed is:

1. A water-soluble hydrophobically associating copolymer comprising
   (a) 0.1 to 20% by weight of at least one hydrophobically associating monomer (a), and
   (b) 25 to 99.9% by weight of at least one hydrophilic monomer (b) other than monomer (a),
   with use of at least one further, nonpolymerizable surface-active component (c) in the course of synthesis thereof, prior to the initiation of the polymerization reaction,
   where the stated amounts are each based on the total amount of all monomers in the copolymer, at least one of the monomers (a) being a monomer of the general formula (I)

$$H_2C=C(R^1)-R^2-O-(-CH_2-CH_2-O-)_k-(-CH_2-CH(R^3)-O-)_l-(-CH_2-CH_2-O-)_m-R^4 \quad (I)$$

where the $-(-CH_2-CH_2-O-)_k$, $-(-CH_2-CH(R^3)-O-)_l$ and optionally $-(-CH_2-CH_2-O-)_m$ units are arranged in block structure in the sequence shown in formula (I)
   and the radicals and indices are each defined as follows:
   k: is a number from 15 to 35;
   l: is a number from 5 to 25;
   m: is a number from 0 to 15;
   $R^1$: is H or methyl;
   $R^2$: is independently a single bond or a divalent linking group selected from the group consisting of $-(C_nH_{2n})-$ and $-O-(C_nH_{2n'})-$, where n is a natural number from 1 to 6 and n' is a natural number from 2 to 6;
   $R^3$: is independently a hydrocarbyl radical having at least 2 carbon atoms or an ether group of the general formula $-CH_2-O-R^{3'}$ where $R^{3'}$ is a hydrocarbyl radical having at least 2 carbon atoms; with the proviso that the sum total of the carbon atoms in all hydrocarbyl radicals $R^3$ or $R^{3'}$ is in the range from 15 to 50,
   $R^4$: is independently H or a hydrocarbyl radical having 1 to 4 carbon atoms;
   and the hydrophobically associating monomer (a) of the general formula (I) is obtained by a process comprising the following steps:
   a) reacting a monoethylenically unsaturated alcohol A1 of the general formula (II)

$$H_2C=C(R^1)-R^2-OH \quad (II)$$

with ethylene oxide,
   where the $R^1$ and $R^2$ radicals are each as defined above;
   with addition of an alkaline catalyst C1 comprising KOMe and/or NaOMe to obtain an alkoxylated alcohol A2;
   b) reacting the alkoxylated alcohol A2 with at least one alkylene oxide Z of the formula (Z)

where $R^3$ is as defined above;
   with addition of an alkaline catalyst C2;
   where the concentration of potassium ions in the reaction in step b) is less than or equal to 0.9 mol %, based on the alcohol A2 used;
   and where the reaction in step b) is performed at a temperature less than or equal to 135° C.,
   to obtain an alkoxylated alcohol A3 of the formula (III)

$$H_2C=C(R^1)-R^2-O-(-CH_2-CH_2-O-)_k-(-CH_2-CH(R^3)-O-)_l-R^4 \quad (III)$$

where $R^4=H$, where the $R^1$, $R^2$ and $R^3$ radicals and the indices k and l are each as defined above;
   c) optionally reacting at least a portion of the alkoxylated alcohol A3 with ethylene oxide to obtain an alkoxylated alcohol A4 corresponding to the monomer (a) of the formula (I) where $R^4=H$ and in is greater than 0;
   d) optionally etherifying the alkoxylated alcohol A3 and/or A4 with a compound $$R_4-X$$

where $R^4$ is as defined above and X is a leaving group, preferably selected from the group consisting of Cl, Br, I, $-O-SO_2-CH_3$ (mesylate), $-O-SO_2-CF_3$ (triflate) and $-O-SO_2-OR^4$
   to obtain a monomer (a) of the formula (I) where $R^4$=hydrocarbyl radical having 1 to 4 carbon atoms.

2. The copolymer according to claim 1, wherein the radicals and indices are each defined as follows:
   k: is a number from 23 to 26;
   l: is a number from 5 to 25;
   m: is a number from 0 to 15;
   $R^1$: is H or methyl;
   $R^2$: is independently a single bond or a divalent linking group selected from the group consisting of —$(C_nH_{2n})$— and —O—$(C_{n'}H_{2n'})$—, where n is a natural number from 1 to 6 and n' is a natural number from 2 to 6;

$R^3$: is independently a hydrocarbyl radical having at least 2 carbon atoms or an ether group of the general formula —$CH_2$—O—$R^{3'}$ where $R^{3'}$ is a hydrocarbyl radical having at least 2 carbon atoms; with the proviso that the sum total of the carbon atoms in all hydrocarbyl radicals $R^3$ or $R^{3'}$ is in the range from 15 to 50, R4: is independently H or a hydrocarbyl radical having 1 to 4 carbon atoms.

3. The copolymer according to claim 1, wherein the radicals and indices are each defined as follows:
k: is a number from 23 to 26;
l: is a number from 8.5 to 17.25;
m: is a number from 0 to 15;
$R^1$: is H or methyl;
$R^2$: is independently a single bond or a divalent linking group selected from the group consisting of —$(C_nH_{2n})$— and —O—$(C_{n'}H_{2n'})$—, where n is a natural number from 1 to 6 and n' is a natural number from 2 to 6;
$R^3$: is independently a hydrocarbyl radical having at least 2 carbon atoms or an ether group of the general formula —$CH_2$—O—$R^{3'}$ where $R^{3'}$ is a hydrocarbyl radical having at least 2 carbon atoms; with the proviso that the sum total of the carbon atoms in all hydrocarbyl radicals $R^3$ or $R^{3'}$ is in the range from 25.5 to 34.5,
$R^4$: is independently H or a hydrocarbyl radical having 1 to 4 carbon atoms.

4. The copolymer according to claim 1, wherein the radicals and indices are each defined as follows:
k: is a number from 23 to 26;
l: is a number from 12.75 to 17.25;
m: is a number from 0 to 15;
$R^1$: is H;
$R^2$: is a divalent linking group —O—$(C_{n'}H_{2n'})$— where n' is 4;
$R^3$: is independently a hydrocarbyl radical having 2 carbon atoms;
$R^4$: is H.

5. The copolymer according to claim 1, wherein the radicals and indices are each defined as follows:
k: is a number from 23 to 26;
l: is a number from 8.5 to 11.5;
m: is a number from 0 to 15;
$R^1$: is H;
$R^2$: is a divalent linking group —O—$(C_{n'}H_{2n'})$— where n' is 4;
$R^3$: is a hydrocarbyl radical having 3 carbon atoms;
$R^4$: is H.

6. The copolymer according to claim 1, wherein the monomer (a) of the general formula (I) is a mixture of a monomer (a) of the formula (I) where m=0 and a monomer (a) of the formula (I) where m=1 to 15.

7. The copolymer according to claim 6, wherein the weight ratio of the monomer of the formula (I) where m=0 and the monomer of the formula (I) where m=1 to 15 is in the range from 19:1 to 1:19.

8. The copolymer according to claim 1, wherein the concentration of potassium ions in the preparation of monomer (a), in the reaction in step b), is 0.01 to 0.5 mol % based on the alcohol A2 used.

9. The copolymer according to claim 1, wherein the preparation of monomer a) involves using a catalyst C2 comprising at least one basic sodium compound in step b), the concentration of sodium ions in the reaction in step b) being in the range from 3.5 mol % to 12 mol %, based on the alcohol A2 used.

10. The copolymer according to claim 1, wherein step b) in the preparation of monomer (a) is performed at a pressure in the range from 1 to 3.1 bar and a temperature of 120 to 135° C.

11. The copolymer according to claim 1, wherein $R^3$ is a hydrocarbyl radical having 2 carbon atoms and step b) in the preparation of monomer (a) is performed at a pressure in the range from 1 to 3.1 bar; or $R^3$ is a hydrocarbyl radical having at least 3 carbon atoms and step b) in the preparation of monomer (a) is performed at a pressure of 1 to 2.1 bar.

12. The copolymer according to claim 1, wherein at least one of the monomers (b) is a monomer comprising acidic groups, the acidic groups being at least one group selected from the group of —COOH, —$SO_3H$ and —$PO_3H_2$, and salts thereof.

13. The copolymer according to claim 1, which comprises at least two different hydrophilic monomers (b) which are
at least one uncharged hydrophilic monomer (b1), and
at least one hydrophilic anionic monomer (b2) comprising at least one acidic group selected from the group consisting of —COOH, —$SO_3H$ and —$PO_3H_2$ and salts thereof.

14. The copolymer according to claim 1, comprising
(a) 2% by weight of at least one hydrophobically associating monomer (a), and
(b) 50% by weight of acrylamide as an uncharged hydrophilic monomer (b1), and
(c) 48% by weight of acrylamido-2-methylpropanesulfonic acid (AMPS) as an anionic hydrophilic monomer (b2),
where the stated amounts are each based on the total amount of all monomers in the copolymer.

15. The copolymer according to claim 1, wherein component (c) is at least one nonionic surfactant.

16. A process for preparing a water-soluble, hydrophobically associating copolymer according to claim 1, which comprises subjecting at least one hydrophobically associating monomer (a) and at least one hydrophilic monomer (b) to an aqueous solution polymerization in the presence of at least one surface-active component (c), the monomer (a) of the general formula (I) being prepared by a process as described in claim 1.

17. The process for preparing a copolymer according to claim 16, wherein the solution polymerization is performed at a pH in the range from 5.0 to 7.5.

18. A method of using the copolymer according to claim 1 in the development, exploitation and completion of underground mineral oil and natural gas deposits.

19. A method for tertiary mineral oil production, comprising injecting an aqueous formulation of the copolymer according to claim 1 in a concentration of 0.01 to 5% by weight into a mineral oil deposit through at least one injection well; and
withdrawing crude oil from the deposit through at least one production well.

20. The method according to claim 19, wherein the aqueous formulation of said copolymers comprises at least one surfactant.

* * * * *